United States Patent
Yin et al.

(10) Patent No.: US 9,749,094 B2
(45) Date of Patent: Aug. 29, 2017

(54) DEVICES FOR SENDING AND RECEIVING FEEDBACK INFORMATION

(71) Applicant: SHARP KABUSHIKI KAISHA, Nagaike-Cho, Abenu-Ku; Osaka (JP)

(72) Inventors: Zhanping Yin, Vancouver, WA (US); Shohei Yamada, Camas, WA (US)

(73) Assignee: Sharp Kabushiki Kaisha, Sakai (JP)

( * ) Notice: Subject to any disclaimer, the term of this patent is extended or adjusted under 35 U.S.C. 154(b) by 374 days.

(21) Appl. No.: 13/631,433

(22) Filed: Sep. 28, 2012

(65) Prior Publication Data

US 2013/0336160 A1    Dec. 19, 2013

Related U.S. Application Data

(60) Provisional application No. 61/659,892, filed on Jun. 14, 2012.

(51) Int. Cl.
*H04L 1/18*      (2006.01)
*H04L 5/00*      (2006.01)
*H04W 72/04*     (2009.01)

(52) U.S. Cl.
CPC .......... *H04L 1/1854* (2013.01); *H04L 5/0055* (2013.01); *H04L 1/1861* (2013.01); *H04W 72/0446* (2013.01)

(58) Field of Classification Search
CPC ....... H04L 5/0055; H04L 1/1854; H04L 1/18; H04L 1/1812; H04L 1/1861; H04M 3/42195; H04W 72/0406; H04W 72/0446; H04W 72/1205
See application file for complete search history.

(56) References Cited

U.S. PATENT DOCUMENTS

| | | | |
|---|---|---|---|
| 8,885,526 B2 * | 11/2014 | He et al. ................ | 370/280 |
| 2010/0165939 A1 * | 7/2010 | Lin ............................ | 370/329 |
| 2013/0034029 A1 * | 2/2013 | Lee ............................ | 370/280 |
| 2013/0242816 A1 * | 9/2013 | He et al. ................ | 370/280 |
| 2013/0301490 A1 * | 11/2013 | He et al. ................ | 370/280 |
| 2013/0322358 A1 * | 12/2013 | He et al. ................ | 370/329 |
| 2014/0064159 A1 * | 3/2014 | Larsson et al. ........ | 370/280 |
| 2014/0078981 A1 * | 3/2014 | Larsson et al. ........ | 370/329 |
| 2014/0092824 A1 * | 4/2014 | He et al. ................ | 370/329 |

(Continued)

FOREIGN PATENT DOCUMENTS

WO    2012/036479    3/2012

OTHER PUBLICATIONS

3GPP TS 36.213 V10.5.0 (Mar. 2012), pp. 1-10 and 68-121.*

(Continued)

*Primary Examiner* — Habte Mered
(74) *Attorney, Agent, or Firm* — Keating & Bennett, LLP

(57) ABSTRACT

A method for sending feedback information by a User Equipment (UE) is described. The method includes determining uplink-downlink (UL-DL) configurations for multiple cells. At least two of the multiple cells have different uplink-downlink (UL-DL) configurations. The method also includes determining first feedback factors for the multiple cells based on a second feedback factor. The method further includes sending Hybrid Automatic Repeat Request Acknowledgement/Negative Acknowledgement (HARQ-ACK) information on a Physical Uplink Shared Channel (PUSCH) based on the first feedback factors for the multiple cells.

8 Claims, 11 Drawing Sheets

(56) References Cited

U.S. PATENT DOCUMENTS

2014/0328292 A1* 11/2014 Yang et al. .................. 370/329
2014/0328332 A1* 11/2014 Yang et al. .................. 370/336

OTHER PUBLICATIONS

3GPP TS 36.211 V9.0.0, "Evolved Universal Terrestrial Radio Access (E-UTRA); Physical Channels and Modulation (Release 9)," Dec. 2009.
3GPP TS 36.213 V8.6.0, "Evolved Universal Terrestrial Radio Access (E-UTRA); Physical Layer Procedures (Release 8)," Mar. 2009.
MCC Support, "Final Report of 3GPP TSG RAN WG1 #69 v1.0.0," 3GPP TSG RAN WG1 Meeting #70, R1-123081, Aug. 2012.
Catt et al., "Way Forward on HARQ-ACK Transmission for TDD Inter-Band CA," 3GPP TSG RAN WG1 Meeting #69, May 21-25, 2012, 4 pages.
3rd Generation Partnership Project; Technical Specification Group Radio Access Network; Evolved Universal Terrestrial Radio Access (E-UTRA); Physical Layer Procedures (Release 10), 3GPP TS 36.213 V10.5.0, Mar. 2012, pp. 68-74 and 106.
Sharp,"Remaining Issues for HARQ-ACK Reporting on PUSCH Adjusted by UL Grant for TDD Inter-Band CA," 3GPP TSG-RAN WGl #70, Aug. 13-17, 2012, pp. 1-5.
3rd Generation Partnership Project; Technical Specification Group Radio Access Network; Evolved Universal Terrestrial Radio Access (E-UTRA); Multiplexing and channel coding (Release 10), 3GPP TS 36.212 V10.5.0, Mar. 7, 2012, 21 pages.

* cited by examiner

US 9,749,094 B2

DEVICES FOR SENDING AND RECEIVING FEEDBACK INFORMATION

RELATED APPLICATIONS

This application is related to and claims priority from U.S. Provisional Patent Application Ser. No. 61/659,892, filed Jun. 14, 2012, for DEVICES FOR SENDING AND RECEIVING FEEDBACK INFORMATION, which is incorporated herein by reference.

TECHNICAL FIELD

The present disclosure relates generally to communication systems. More specifically, the present disclosure relates to devices for sending and receiving feedback information.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
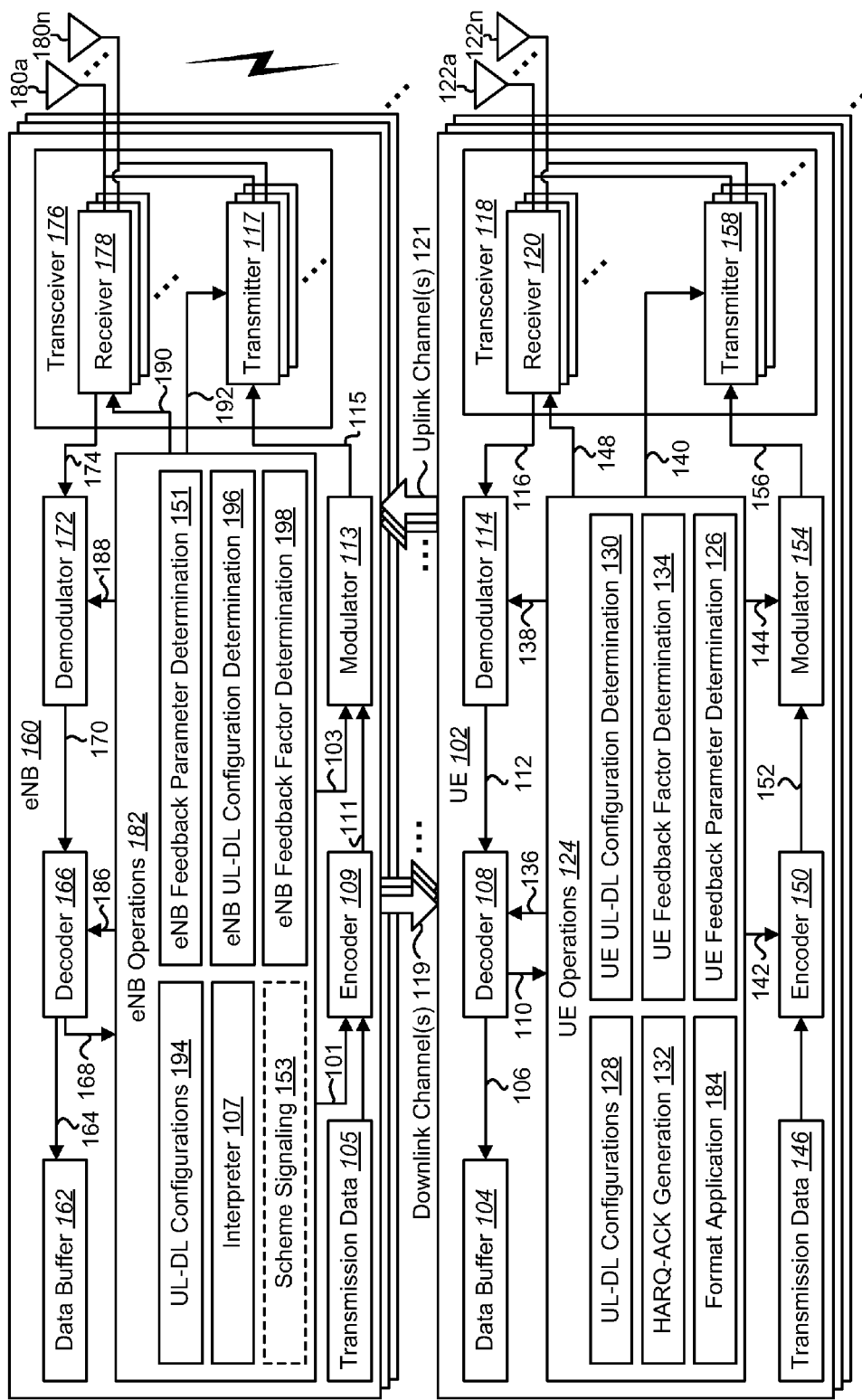
FIG. 1 is a block diagram illustrating one configuration of one or more evolved Node Bs (eNBs) and one or more User Equipments (UEs) in which systems and methods for sending and receiving feedback information may be implemented.

A method for sending feedback information by a User Equipment (UE) is described. The method includes determining uplink-downlink (UL-DL) configurations for multiple cells. At least two of the multiple cells have different uplink-downlink (UL-DL) configurations. The method also includes determining first feedback factors for the multiple cells based on a second feedback factor. The method further includes sending Hybrid Automatic Repeat Request Acknowledgement/Negative Acknowledgement (HARQ-ACK) information on a Physical Uplink Shared Channel (PUSCH) based on the first feedback factors for the multiple cells. The method may include determining a selection scheme for the second feedback factor (e.g., $W_{DAI}^{UL}$) when multiple uplink grants are triggered from multiple cells with multiple second feedback factors.

Each of the first feedback factors may be $B_c^{DL}$. $B_c^{DL}$ may be a number of downlink subframes to feed back HARQ-ACK bits for a c-th serving cell. Determining the first feedback factors may be further based on feedback parameters $M_c$ for the multiple cells.

If UL-DL configuration 5 is a reference configuration for one of the multiple cells, determining the first feedback factors may be further based on a third feedback factor U. U may denote a maximum value of $U_c$ among all configured serving cells. $U_c$ may be a total number of received Physical Downlink Shared Channels (PDSCHs) and Physical Downlink Control Channel indicating a downlink semi-persistent scheduling (SPS) release on a c-th serving cell.

The second feedback factor may be a parameter for a PUSCH transmission in a subframe adjusted based on a detected Physical Downlink Control Channel (PDCCH) with Downlink Control Information (DCI) format 0/4. The second feedback factor may be $W_{DAI}^{UL}$, which may be determined based on a Downlink Assignment Index (DAI) in DCI format 0/4. The method may include determining the second feedback factor for an UL grant without $W_{DAI}^{UL}$. The method may include determining the second feedback factor for multiple Downlink Assignment Indexes (DAI) in Downlink Control Information (DCI) format 0/4 with different uplink grant timings. The method may include determining the second feedback factor $W_{DAI}^{UL}$ with an associated $W_{DAI}^{UL}$ of a cell carrying the HARQ-ACK information when multiple uplink grants are triggered from multiple cells. $W_{DAI}^{UL}$ may correspond to an uplink reference UL-DL configuration of a serving cell corresponding to a PUSCH transmission.

A method for sending feedback information by an evolved Node B (eNB) is also described. The method includes determining uplink-downlink (UL-DL) configurations for multiple cells. At least two of the multiple cells have different uplink-downlink (UL-DL) configurations. The method also includes determining first feedback factors for the multiple cells based on a second feedback factor. The method further includes receiving Hybrid Automatic Repeat Request Acknowledgement/Negative Acknowledgement (HARQ-ACK) information on a Physical Uplink Shared Channel (PUSCH) based on the first feedback factors for the multiple cells. The method may include determining a selection scheme for the second feedback factor $W_{DAI}^{UL}$, when multiple uplink grants are triggered from multiple cells with multiple second feedback factors.

Each of the first feedback factors may be $B_c^{DL}$. $B_c^{DL}$ may be a number of downlink subframes to feed back HARQ-ACK bits for a c-th serving cell. Determining the first feedback factors may be further based on feedback parameters $M_c$ for the multiple cells.

If UL-DL configuration 5 is a reference configuration for one of the multiple cells, determining the first feedback factors may be further based on a third feedback factor U. U may denote a maximum value of $U_c$ among all configured serving cells, wherein $U_c$ is a total number of sent Physical Downlink Shared Channels (PDSCHs) and Physical Downlink Control Channel indicating a downlink semi-persistent scheduling (SPS) release on a c-th serving cell.

The second feedback factor may be a parameter for a PUSCH transmission in a subframe adjusted based on a detected PDCCH with DCI format 0/4. The second feedback factor may be $W_{DAI}^{UL}$, which is determined based on a Downlink Assignment Index (DAI) in DCI format 0/4. The method may include determining the second feedback factor for an UL grant without $W_{DAI}^{UL}$. The method may include determining the second feedback factor for multiple Downlink Assignment Indexes (DAI) in Downlink Control Information (DCI) format 0/4 with different uplink grant timings. The method may include determining the second feedback factor $W_{DAI}^{UL}$ with an associated $W_{DAI}^{UL}$ of a cell carrying the HARQ-ACK information when multiple uplink grants are triggered from multiple cells. $W_{DAI}^{UL}$ may correspond to an uplink reference UL-DL configuration of a serving cell corresponding to a PUSCH transmission.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a PDSCH. "Deactivated cells" are those configured cells that the UE is not monitoring the transmission PDCCH. It should be noted that a "cell" may be described in terms of differing dimensions or attributes. For example, a "cell" may have temporal, spatial (e.g., geographical), propagation and frequency characteristics.

The systems and methods disclosed herein describe devices for sending and receiving feedback information. This may be done in the context of carrier aggregation. For example, PDSCH HARQ-ACK reporting and multiplexing on a PUSCH for carrier aggregation (e.g., inter-band or intra-band carrier aggregation) with different Time-Division Duplexing (TDD) UL-DL configurations is described.

In accordance with the systems and methods disclosed herein, different TDD UL-DL configurations may be used for inter-band carrier aggregation. In other words, the cells or component carriers (CCs) in different bands may have different UL-DL configurations. Carrier aggregation refers to the concurrent utilization of more than one carrier. In one example, carrier aggregation may be used to increase the effective bandwidth available to a UE. One type of carrier aggregation is inter-band carrier aggregation. In inter-band carrier aggregation, multiple carriers from multiple bands may be aggregated. For example, a carrier in a first band may be aggregated with a carrier in a second band. As used herein, the term "concurrent" and variations thereof may denote that at least two events may overlap each other in time, and may or may not mean that the at least two events begin and/or end at precisely the same time. The systems and methods disclosed herein may not be restricted to inter-band carrier aggregation and may also be applied to intra-band carrier aggregation.

As used herein, the term "configuration" may refer to an UL-DL configuration. An UL-DL configuration specifies whether each subframe within a radio frame is an UL subframe, a DL subframe or a special subframe. More detail regarding UL-DL configurations is given in connection with Table (1) below. A "PCell configuration" may refer to an UL-DL configuration that corresponds to a PCell. For example, a PCell configuration is an UL-DL configuration applied by the eNB and UE for communications in the PCell. The PCell configuration may be signaled to a UE by an eNB in a SystemInformationBlockType1 (SIB-1). The SIB-1 may be transmitted (by an eNB, for example) on a broadcast control channel as a logical channel. An "SCell configuration" may refer to an UL-DL configuration that corresponds to an SCell. For example, an SCell configuration is an UL-DL configuration applied by the eNB and UE for communications in an SCell. An SCell configuration may be signaled to a UE with carrier aggregation by an eNB in dedicated Radio Resource Control (RRC) signaling. The dedicated RRC signaling may be transmitted (by an eNB, for example) on a dedicated control channel as a logical channel.

Additionally or alternatively, an eNB may send the SCell configuration in SIB-1 for UEs using the cell as a PCell. Typically, the eNB sends the same system information parameters between the SIB-1 for UEs using the cell as the PCell and the dedicated RRC signaling for UEs with carrier aggregation, though this is not strictly required. However, the parameters that are cell-specific parameters are signaled to a UE with carrier aggregation via dedicated RRC signaling and may be signaled to UEs using the cell as a PCell may be referred to as an SCell SIB-1 configuration or an SCell configuration.

Carrier aggregation may assume that the same eNB scheduler manages communication resources for the PCell and SCell(s). Thus, the scheduler may know the actual configuration of each cell. The UEs may be informed (by an eNB, for example) of the actual UL-DL configuration of each aggregated cell, particularly if a cell has a different UL-DL configuration from the PCell.

Time-Division Duplexing (TDD) Uplink-Downlink (UL-DL) configurations may be referred to as "UL-DL configurations" or a similar term herein for convenience. Additionally, an UL-DL configuration corresponding to a PCell may be referred to as a "PCell configuration" and an UL-DL configuration corresponding to an SCell may be referred to as an "SCell configuration" for convenience herein. Furthermore, "uplink" may be abbreviated as "UL" and "downlink" may be abbreviated as "DL" for convenience herein.

TDD UL-DL configurations 0-6 are given below in Table (1) (from Table 4.2-2 in 3GPP TS 36.211). UL-DL configurations with both 5 millisecond (ms) and 10 ms downlink-to-uplink switch-point periodicity may be supported. In particular, seven UL-DL configurations are specified in 3GPP specifications, as shown in Table (1) below. In Table (1), "D" denotes a downlink subframe, "S" denotes a special subframe and "U" denotes an UL subframe. The UL-DL configurations illustrated in Table (1) may be utilized in accordance with the systems and methods disclosed herein.

TABLE (1)

| TDD UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Enhanced carrier aggregation (eCA) may include inter-band or intra-band carrier aggregation (CA) with different UL-DL configurations. For example, the systems and methods disclosed herein may enable inter-band CA with different UL-DL configurations, which may be supported in Rel-11. Furthermore, predetermined PDSCH HARQ-ACK reporting associations may be utilized in accordance with the systems and methods disclosed herein.

In LTE Releases 8 and 9, there is no aggregation of TDD cells. In LTE Release 10, TDD CA only permits aggregation of cells with the same UL-DL configuration. Therefore, the same set of parameters is utilized to determine the HARQ-ACK bits of all cells. However, for releases beyond Release 10, for TDD CA with different UL-DL configurations, different sets of parameters may be utilized for different cells. Thus, new issues arise concerning multiplexing HARQ-ACK bits on different PUCCH formats as well as reporting procedures on the PUSCH.

As stated before, TDD carrier aggregation in Rel-10 only admits aggregation of cells with the same TDD configuration. The PDSCH HARQ-ACK reporting on the PUSCH uses a feedback factor $W_{DAI}^{UL}$ to determine the number of subframes and HARQ-ACK bits to be reported for a cell in a PUSCH transmission adjusted based on a detected PDCCH with DCI format 0/4 (e.g., DCI format 0 or DCI format 4).

For TDD CA with different TDD configurations, the valid range of $W_{DAI}^{UL}$ of a cell may be different from a cell with the same configuration. Also, the procedure to determine $W_{DAI}^{UL}$ may be different from Rel-10. Furthermore, due to different UL grant timing, multiple UL grants may be triggered from different subframes with different $W_{DAI}^{UL}$ values, which may need to be specified in Rel-11 and beyond.

If an UL grant is issued on a cell with UL-DL configuration 0, $W_{DAI}^{UL}$ may not be present. Accordingly, there is a need to specify how to determine the number of HARQ-ACK bits of other cells if in a PUSCH transmission is adjusted based on a detected PDCCH with DCI format 0/4. Moreover, if UL-DL configuration 5 is used in a cell or as the reference configuration of a cell, a procedure to determine HARQ-ACK bits based on $W_{DAI}^{UL}$ may need to be specified.

For example, methods for sending and receiving feedback information by an eNB and a UE are described. The methods include determining uplink-downlink (UL-DL) configurations for multiple cells, where at least two of the multiple cells have different uplink-downlink (UL-DL) configurations. The methods also include determining first feedback factors for the multiple cells based on a second feedback factor. The methods further include sending and receiving Hybrid Automatic Repeat Request Acknowledgement/

Negative Acknowledgement (HARQ-ACK) information on a Physical Uplink Shared Channel (PUSCH) based on the first feedback factors for the multiple cells.

Each of the first feedback factors may be $B_c^{DL}$, where $B_c^{DL}$ is a number of downlink subframes to feed back HARQ-ACK bits for a c-th serving cell. The second feedback factor may be $W_{DAI}^{UL}$, which may be determined based on a Downlink Assignment Index (DAI) in DCI format 0/4. If UL-DL configuration 5 is configured for one of the multiple cells or is a reference configuration for one of the multiple cells, the first feedback factors may be determined based on a third feedback factor U, where U denotes a maximum value of $U_c$ among all configured serving cells, where $U_c$ is a total number of received PDSCHs and PDCCH indicating a downlink semi-persistent scheduling (SPS) release on a c-th serving cell.

The first feedback factors may be determined based on feedback parameters $M_c$. For example, depending on the configurations, $B_c^{DL} = \min(W_{DAI}^{UL}, M_c)$ or $$B_c^{DL} = \min\left(\left(W_{DAI}^{UL} + 4\left\lceil \frac{(U - W_{DAI}^{UL})}{4} \right\rceil\right), M_c\right),$$

etc.

In accordance with the systems and methods disclosed herein, for TDD CA with different UL-DL configurations within UL-DL configurations 1-6, the range of $W_{DAI}^{UL}$ may be determined in DCI format 0/4. The range of $W_{DAI}^{UL}$ may be determined based on the maximum values of $M_c$ of all cells (more detail regarding $M_c$ is given below). Thus, in Rel-11 with TDD CA with different TDD configurations, the $W_{DAI}^{UL}$ value indicated on a detected PDCCH with DCI format 0/4 (e.g., an UL grant) of a cell may be more than the $M_c$ of the cell itself in some instances. It should be noted that this is not allowed in Rel-10. If UL-DL configuration 5 is configured for a cell or is used as the reference configuration of a cell, then for PDSCH HARQ-ACK reporting on the PUSCH in subframe 2 (e.g., an UL subframe for configuration 5 is subframe 2), the $W_{DAI}^{UL}$ and HARQ-ACK bits of all cells may follow the rule for UL-DL configuration 5.

The systems and methods disclosed herein may enable determining the feedback factor $W_{DAI}^{UL}$ and HARQ-ACK bits used for other cells in adjusted PUSCH reporting for an UL grant issued by a cell with UL-DL configuration 0. Furthermore, the systems and methods disclosed herein may enable determining the values of $W_{DAI}^{UL}$ in DCI format 0/4 with different UL grant timings. Additionally, the systems and methods disclosed herein may enable determining a selection scheme when multiple UL grants are triggered from multiple cells with multiple $W_{DAI}^{UL}$.

For clarity, HARQ-ACK reporting on PUSCH in Rel-10 for more than one cell is described. In particular, UE procedures for determining Channel State Information (CSI) and HARQ-ACK reporting in Rel-10 are detailed in Section 10.1 of 3GPP TS 36.213, a portion of which is given below. In Rel-10, the PDSCH HARQ-ACK may be reported on the PUSCH if simultaneous PUCCH and PUSCH is not configured.

If the UE is configured with more than one serving cell and is not configured for simultaneous PUSCH and PUCCH transmission, then in subframe n UCI shall be transmitted on PUCCH using format 1/1a/1b/3 or 2/2a/2b if the UE is not transmitting PUSCH on PUSCH of the serving cell given in section 7.2.1 if the UCI consists of aperiodic CSI or aperiodic CSI and HARQ-ACK on primary cell PUSCH if the UCI consists of periodic CSI and/or HARQ-ACK and if the UE is transmitting on the primary cell PUSCH in subframe n unless the primary cell PUSCH transmission corresponds to a Random Access Response Grant or a retransmission of the same transport block as part of the contention based random access procedure, in which case UCI is not transmitted on PUSCH of the secondary cell with smallest SCellIndex if the UCI consists of periodic CSI and/or HARQ-ACK and if the UE is not transmitting PUSCH on primary cell but is transmitting PUSCH on at least one secondary cell The Rel-10 procedure for HARQ-ACK reporting is given in section 7.3 of 3GPP TS 36.213. Some segments related to PUSCH reporting are given as follows.

For TDD UL-DL configuration 1-6 and a UE configured with more than one serving cell, or for TDD UL-DL configuration 1-6 and a UE configured with one serving cell and PUCCH format 3, a value $W_{DAI}^{UL}$ is determined by the Downlink Assignment Index (DAI) in DCI format 0/4 according to Table 7.3-Z in subframe n−k', where k' is defined in Table 7.3-Y. In case neither PDSCH transmission, nor PDCCH indicating the downlink SPS resource release is intended to the UE, the UE can expect that the value of $W_{DAI}^{UL}$ is set to 4 by the DAI in DCI format 0/4 if transmitted.

For all TDD UL-DL configurations, denote $U_{DAI,c}$ as the total number of PDCCH(s) with assigned PDSCH transmission(s) and PDCCH indicating downlink SPS release detected by the UE within the subframe(s) n−k in serving cell c, where k∈K. When configured with one serving cell, the subscript of c in $U_{DAI,c}$ can be omitted. Denote $N_{SPS}$, which can be zero or one, as the number of PDSCH transmissions without a corresponding PDCCH within the subframe(s) n−k, where k∈K.

For TDD, when PUCCH format 3 is configured for transmission of HARQ-ACK, the HARQ-ACK feedback bits $o_{c,0}^{ACK} o_{c,1}^{ACK} \ldots, o_{c,O_c^{ACK}-1}^{ACK}$ for the c-th serving cell configured by RRC are constructed as follows, where c≥0, $O_c^{ACK} = B_c^{DL}$ if transmission mode configured in the c-th serving cell supports one transport block or spatial HARQ-ACK bundling is applied and $O_c^{ACK} = 2B_c^{DL}$ otherwise, where $B_c^{DL}$ is the number of downlink subframes for which the UE needs to feedback HARQ-ACK bits for the c-th serving cell.

For the case that the UE is transmitting on PUCCH, $B_c^{DL}$=M where M is the number of elements in the set K defined in Table 10.1.3.1-1 associated with subframe n and the set K does not include a special subframe of configurations 0 and 5 with normal downlink CP or of configurations 0 and 4 with extended downlink CP; otherwise $B_c^{DL}$=M−1.

For TDD UL-DL configuration 0 or for a PUSCH transmission not adjusted based on a detected PDCCH with DCI format 0/4, the UE shall assume $B_c^{DL}$=M where M is the number of elements in the set K defined in Table 10.1.3.1-1 associated with subframe n and the set K does not include a special subframe of configurations 0 and 5 with normal downlink CP or of configurations 0 and 4 with extended downlink CP; otherwise $B_c^{DL}$=M−1. The UE shall not transmit HARQ-ACK on PUSCH if the UE does not receive PDSCH or PDCCH indicating downlink SPS release in subframe(s) n−k, where k∈K.

For TDD UL-DL configurations {1, 2, 3, 4, 6} and a PUSCH transmission adjusted based on a detected PDCCH with DCI format 0/4, the UE shall assume $B_c^{DL} = W_{DAI}^{UL}$. The UE shall not transmit HARQ-ACK on PUSCH if the UE does not receive PDSCH or PDCCH indicating downlink SPS release in subframe(s) n−k where k∈K and $W_{DAI}^{UL}=4$.

For TDD UL-DL configurations 5 and a PUSCH transmission adjusted based on a detected PDCCH with DCI format 0/4, the UE shall assume $B_c^{DL} = W_{DAI}^{UL} + \lceil 4(U - W_{DAI}^{UL})/4 \rceil$, where U denotes the maximum value of $U_c$ among all the configured serving cells, $U_c$ is the total number of received PDSCHs and PDCCH indicating downlink SPS release in subframe(s) n−k on the c-th serving cell, k∈K. The UE shall not transmit HARQ-ACK on PUSCH if the UE does not receive PDSCH or PDCCH indicating downlink SPS release in subframe(s) n−k where k∈K and $W_{DAI}^{UL}=4$.

For TDD, when PUCCH format 3 is configured for transmission of HARQ-ACK, for TDD UL-DL configurations 1-6, the HARQ-ACK for a PDSCH transmission with a corresponding PDCCH or for a PDCCH indicating downlink SPS release in subframe n−k is associated with $o_{c,DAI(k)-1}^{ACK}$ if transmission mode configured in the c-th serving cell supports one transport block or spatial HARQ-ACK bundling is applied, or associated with $o_{c,2DAI(k)-2}^{ACK}$ and $o_{c,2DAI(k)-1}^{ACK}$ otherwise, where DAI(k) is the value of DAI in DCI format 1A/1B/1D/1/2/2A/2B/2C detected in subframe n−k, $o_{c,2DAI(k)-2}^{ACK}$ and $o_{c,2DAI(k)-1}^{ACK}$ are the HARQ-ACK feedback for codeword 0 and codeword 1, respectively. For the case with $N_{SPS}>0$, the HARQ-ACK associated with a PDSCH transmission without a corresponding PDCCH is mapped to $o_{c,o_c^{ACK}-1}^{ACK}$. The HARQ-ACK feedback bits without any detected PDSCH transmission or without detected PDCCH indicating downlink SPS release are set to NACK;

for TDD UL-DL configuration 0, the HARQ-ACK for a PDSCH transmission or for a PDCCH indicating downlink SPS release in subframe n−k is associated with $o_{c,0}^{ACK}$ if transmission mode configured in the c-th serving cell supports one transport block or spatial HARQ-ACK bundling is applied, or associated with $o_{c,0}^{ACK}$ and $o_{c,1}^{ACK}$ otherwise, where $o_{c,0}^{ACK}$ and $o_{c,1}^{ACK}$ are the HARQ-ACK feedback for codeword 0 and codeword 1, respectively. The HARQ-ACK feedback bits without any detected PDSCH transmission or without detected PDCCH indicating downlink SPS release are set to NACK.

For TDD when format 1b with channel selection is configured for transmission of HARQ-ACK and for 2 configured serving cells, the HARQ-ACK feedback bits $o_0^{ACK}$ $o_1^{ACK}$, . . . , $o_{o^{ACK}-1}^{ACK}$ on PUSCH are constructed as follows.

For TDD UL-DL configuration 0, $o_j^{ACK}$=HARQ-ACK (j), 0≤j≤A−1 as defined in section 10.1.3.2.1. The UE shall not transmit HARQ-ACK on PUSCH if the UE does not receive PDSCH or PDCCH indicating downlink SPS release in subframe(s) n−k where k∈K.

For TDD UL-DL configurations {1, 2, 3, 4, 6} and a PUSCH transmission adjusted based on a detected PDCCH with DCI format 0/4 with $W_{DAI}^{UL}=1$ or 2, $o_j^{ACK}$ is determined as if PUCCH format 3 is configured for transmission of HARQ-ACK, except that spatial HARQ-ACK bundling across multiple codewords within a DL subframe is performed for all serving cells configured with a downlink transmission mode that supports up to two transport blocks in case $W_{DAI}^{UL}=2$.

For TDD UL-DL configurations {1, 2, 3, 4, 6} and a PUSCH transmission adjusted based on a detected PDCCH with DCI format 0/4 with $W_{DAI}^{UL}=3$ or 4, $o_j^{ACK}=o(j)$, 0≤j≤3 as defined in Table 10.1.3.2-5 or in Table 10.1.3.2-6 respectively, where the value of M is replaced by $W_{DAI}^{UL}$. The UE shall not transmit HARQ-ACK on PUSCH if the UE does not receive PDSCH or PDCCH indicating downlink SPS release in subframe(s) n−k where k∈K and $W_{DAI}^{UL}=4$.

For TDD UL-DL configurations {1, 2, 3, 4, 6} and a PUSCH transmission not adjusted based on a detected PDCCH with DCI format 0/4 and a subframe n with M=1 or 2, $o_j^{ACK}$=HARQ-ACK(j), 0≤j≤A−1 as defined in section 10.1.3.2.1. The UE shall not transmit HARQ-ACK on PUSCH if the UE does not receive PDSCH or PDCCH indicating downlink SPS release in subframe(s) n−k where k∈K.

For TDD UL-DL configurations {1, 2, 3, 4, 6} and a PUSCH transmission not adjusted based on a detected PDCCH with DCI ACK format 0/4 and a subframe n with M=3 or 4, $o_j^{ACK}=o(j)$, 0≤j≤3 as defined in Table 10.1.3.2-5 or in Table 10.1.3.2-6 respectively. The UE shall not transmit HARQ-ACK on PUSCH if the UE does not receive PDSCH or PDCCH indicating downlink SPS release in subframe(s) n−k where k∈K.

In some implementations, one or more aspects of HARQ-ACK reporting with different TDD configurations may be given as follows. In carrier aggregation enhancement, support of different TDD uplink-downlink (UL-DL) configurations on different bands is considered. The carrier aggregation with different TDD configurations may be referred to as inter-band carrier aggregation. For simplicity, a PCell SIB1 configuration may be referred to as a PCell configuration and an SCell SIB1 configuration may be referred to as an SCell configuration herein.

In the currently approved Release 10 of LTE, when carrier aggregation is employed, Hybrid Automatic Repeat Request Acknowledgement/Negative Acknowledgement ("HARQ-ACK") of transmitted downlink communications may be transmitted on the Physical Uplink Control Channel (PUCCH) or the PUSCH. The systems and methods disclosed herein describe indicating and determining the number of HARQ-ACK bits of each cell when the UE is transmitting on PUSCH. The systems and methods disclosed herein also describe that the PUSCH transmission may be adjusted based on a detected PDCCH with DCI format 0/4 for the HARQ-ACK reporting.

In RAN1 #68 and RAN1 #68bis, PDSCH HARQ-ACK reporting associations were given in accordance with the following. The PDSCH HARQ-ACK timing may be categorized into three cases (cases A, B and C), depending on whether the PCell configuration is a superset of the SCell configuration, a subset of the SCell configuration or neither. In case A, where the set of DL subframes indicated by the SCell configuration is a subset of the DL subframes indicated by the PCell configuration, the SCell may follow the PCell configuration.

PDSCH HARQ-ACK reporting for case B and case C may be implemented as follows. For the case B, at least in the context of self-scheduling and full duplex communications, where the set of DL subframes indicated by the PCell configuration is a subset of the DL subframes indicated by the SCell configuration, the SCell may follow the SCell configuration. In some implementations, the same rule may be applied in the context of half duplex communications. The cross-carrier scheduling case is left for further study.

For the case C, at least in the context of self-scheduling and full duplex communications, where the set of DL subframes indicated by the SCell configuration is neither a subset of nor a superset of the DL subframes indicated by the PCell configuration, the SCell may follow a reference configuration as illustrated in Table (2) below. The reference configuration may be selected based on overlapping UL subframes in both the PCell and the SCell. In some implementations, the same rule may be applied in the context of half duplex communications. The cross-carrier scheduling case is left for further study.

Table (2) below illustrates UL-DL configurations for PDSCH HARQ-ACK reporting. In particular, the columns illustrate PCell (TDD UL-DL) configurations 0-6, while the rows illustrate SCell (TDD UL-DL) configurations 0-6. The grid intersecting the PCell configurations and SCell configurations illustrates an UL-DL configuration with corresponding PDSCH HARQ-ACK timing that the SCell follows based on the case. In Table (2), "A" represents case A described above. In case A, SCell PDSCH HARQ-ACK timing follows the PCell configuration. In Table (2), "B" represents case B as described above. In case B, SCell PDSCH HARQ-ACK timing follows the SCell configuration. In Table (2), "C" represents case C as described above. In case C, SCell PDSCH HARQ-ACK timing follows a reference (TDD UL-DL) configuration indicated by the number that accompanies an instance of "C" in Table (2). In other words, the number in the grid in Table (2) is the reference configuration that SCell PDSCH HARQ-ACK timing follows in instances of case C. For example, when the PCell configuration is UL-DL configuration 3 and the SCell configuration is UL-DL configuration 1, SCell PDSCH HARQ-ACK timing may follow configuration 4.

TABLE (2)

| SCell PDSCH HARQ-ACK Timing Follows | PCell SIB-1 UL-DL Configuration | | | | | | |
|---|---|---|---|---|---|---|---|
| Configuration # | 0 | 1 | 2 | 3 | 4 | 5 | 6 |
| SCell SIB-1 UL-DL Configuration 0 | | A | A | A | A | A | A |
| 1 | B | | A | C, 4 | A | A | B |
| 2 | B | B | | C, 5 | C, 5 | A | B |
| 3 | B | C, 4 | C, 5 | | A | A | B |
| 4 | B | B | C, 5 | B | | A | B |
| 5 | B | B | B | B | B | | B |
| 6 | B | A | A | A | A | A | |

In LTE Rel-10, a UE that supports aggregating more than one serving cell with frame structure type 2 is configured by higher layers to use either PUCCH format 1b with channel selection or PUCCH format 3 for transmission of HARQ-ACK when configured with more than one serving cell with frame structure type 2. In some implementations (in accordance with RAN1 #69, for instance), for TDD inter-band carrier aggregation with different UL-DL configurations on different bands, a UE may be configured with PUCCH format 3 or PUCCH format 1b with channel selection for HARQ-ACK transmission.

Additionally or alternatively, at least for the self-scheduling case, for a UE configured with PUCCH format 3 for HARQ-ACK transmission, the HARQ-ACK transmission may proceed in accordance with Rel-10 specifications, except for the following. The set of DL subframes (denoted as $K_c$) on serving cell c associated with UL subframe n may include the DL subframes n–k, where k∈K and K is determined according to the timing reference configuration of serving cell c. For HARQ-ACK transmission in an UL subframe n and on PUCCH or on PUSCH not adjusted by an UL grant, a feedback factor $B_c^{DL}=M_c$, where $M_c$ is the number of elements in the set $K_c$.

For HARQ-ACK transmission in an UL subframe n and on PUSCH adjusted by an UL grant, a feedback factor $B_c^{DL}=\min(W_{DAI}^{UL}, M_c)$ if the timing reference configuration is UL-DL configuration 1, 2, 3, 4 or 6. For HARQ-ACK transmission in an UL subframe n and on a PUSCH adjusted by an UL grant, the value of $B_c^{DL}$ if the TDD UL-DL configuration (which is the timing reference configuration) is UL-DL configuration 5 is unaddressed in known approaches. Another case that is unaddressed in known approaches is if the timing reference configuration is UL-DL configuration 0, for HARQ-ACK transmission in an UL subframe n and on a PUSCH adjusted by an UL grant. A timing reference configuration may be the TDD UL-DL configuration which the PDSCH HARQ timing on serving cell c follows. The treatment of format 3 for a cross-carrier scheduling case may also be unaddressed in known approaches.

The systems and methods disclosed herein may address open or unaddressed issues and may provide approaches for HARQ-ACK reporting on a PUSCH. In Rel-10, all cells have the same TDD configuration and thus, the same UL grant timing. Accordingly, if a UE is configured with PUCCH format 3 for HARQ-ACK transmission, for HARQ-ACK transmission in an UL subframe n and on a PUSCH adjusted by an UL grant, the $W_{DAI}^{UL}$ may be the maximum number of the total number of PDCCH(s) with assigned PDSCH transmission(s) and the PDCCH indicating downlink SPS release among all configured cells. Additionally, the same $W_{DAI}^{UL}$ can be applied for all configured cells.

The systems and methods disclosed herein provide approaches to deal with the unaddressed cases (left over from RAN1 #69, for example). Furthermore, approaches are provided to determine $W_{DAI}^{UL}$ for TDD CA with different TDD configurations. It should be noted that RAN1 #69 left some ambiguity in the use of $W_{DAI}^{UL}$ and determination of HARQ-ACK bits. For TDD CA with different TDD configurations, the UL grant timing of different cells may have different UL grant associations and different PDSCH HARQ-ACK association sets. If multiple UL grants are issued on multiple cells with different UL grant timings, the UE may receive multiple $W_{DAI}^{UL}$ (sent from the eNB, for example) with the same or different values. If a UE is configured with PUCCH format 3 for HARQ-ACK transmission, for HARQ-ACK transmission in an UL subframe n and on PUSCH adjusted by an UL grant, the issues unaddressed in known approaches include the following: valid values represented by $W_{DAI}^{UL}$, computation and interpretation of $W_{DAI}^{UL}$ and managing multiple $W_{DAI}^{UL}$ from multiple cells (particularly if they carry different values, for example).

The systems and methods disclosed herein may be applied to at least a PDSCH self-scheduling case when different TDD configurations are used. For cross-carrier scheduling, there may be two alternatives for the SCell PDSCH HARQ-ACK timing. In one alternative, if the SCell follows PCell timing in an uplink subframe reporting, the Rel-10 procedure may be reused for HARQ-ACK reporting on a PUSCH if the $M_c$ of the SCell is set the same as the $M_c$ of the PCell. In another alternative, if the SCell follows a reference configuration as shown in Table (2), this becomes the same as the self-scheduling case and the systems and methods disclosed herein may be applied accordingly.

In accordance with the systems and methods disclosed herein, the M (e.g., $M_c$) of the PCell may be the same as provided in Rel-10 specifications. Furthermore, the systems and methods disclosed herein provide two approaches to determine the M of the SCell. In approach A, the M (e.g., $M_c$) of the SCell may be a reference parameter (e.g., $M_{Ref}$) based on a reference configuration. More specifically, $M_{Ref}$ may be the M of the reference configuration for which the PDSCH HARQ-ACK may be followed. In approach B, the M (e.g., $M_c$) of the SCell is an effective parameter (e.g., $M_{Eff}$) based on an effective number of subframes in the reference configuration.

In LTE Rel-10, M is the number of elements in the set K defined in Table (3) below (from Table 10.1.3.1-1 of 3GPP TS 36.213) associated with subframe n and the set K. In other words, a downlink association set index for TDD may be defined in Table (3) as K: $\{k_0, k_1, \ldots, k_{M-1}\}$, where M is a number of elements in the set K. The downlink association set depends on the UL-DL configuration, as given in Table (3) below. It should also be noted that PDSCH HARQ-ACK timing may be based on one or more TDD UL-DL configurations in TDD CA with different configurations (as illustrated in Table (2), for example).

A PDSCH HARQ-ACK association means the linkage between a PDSCH transmission and its HARQ-ACK feedback in an uplink subframe. For an uplink subframe n, the downlink association set index for TDD is defined in Table 10.1.3.1-1, which is illustrated as Table (3) below. Thus, a PDSCH transmission in a subframe (n–k) where k belongs to the association set index K:$\{k_0, k_1, \ldots, k_{M-1}\}$, the corresponding HARQ-ACK of the PDSCH is reported in the associated uplink subframe n. An entry in Table (3) defines a downlink association (e.g., a PDSCH HARQ-ACK association). The set K defines the PDSCH HARQ-ACK association set for a given uplink.

elements in the set K defined in Table (3) associated with subframe n and the set K according to the PCell configuration). In other words, $M_{PCell}$ indicates a number of subframes with a PDSCH HARQ-ACK association for the PCell configuration.

For case B (e.g., if the set of DL subframes indicated by the PCell configuration is a subset of the DL subframes indicated by the SCell configuration) in approach A, the SCell may follow the SCell configuration. Thus, $M_{Ref}=M_{SCell}$ where $M_{SCell}$ is the M of the SCell (e.g., the number of elements in the set K defined in Table (3) associated with subframe n and the set K according to the SCell configuration). In other words, $M_{SCell}$ indicates a number of subframes with a PDSCH HARQ-ACK association for the SCell configuration.

For case C (e.g., if the set of DL subframes indicated by the PCell configuration is a subset of the DL subframes indicated by the SCell configuration) in approach A, the SCell may follow the reference configuration as shown in Table (2). Thus, $M_{Ref}=M_{RefConf}$ where $M_{RefConf}$ (e.g., a predetermined parameter) is the M of the reference configuration (e.g., the number of elements in the set K defined in Table (3) associated with subframe n and the set K according to the reference UL-DL configuration in Table (2)). In other words, $M_{RefConf}$ indicates a number of subframes with a PDSCH HARQ-ACK association for the reference configuration.

In case A, there are conflicting subframes, where the PCell is configured with a DL subframe (or special subframe, for example) and the SCell is configured with an UL subframe. Thus, the corresponding HARQ-ACK bits will never be generated on the SCell or they may be reported as a discontinuous transmission (DTX). For case A, m may be defined as the number of conflicting subframes, where the PCell configuration includes a DL subframe (or special subframe, for example) and SCell configurations includes an UL subframe in the set K defined in Table (3) associated with subframe n and the set K according to the PCell configuration.

Similarly in case C, there are conflicting subframes, where the reference configuration includes a DL subframe

TABLE (3)

| UL-DL Configuration Number | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In approach A, the $M_c$ of a SCell may be defined as $M_{Ref}$ (e.g., the M of the reference configuration for which the PDSCH HARQ-ACK timing is followed). In other words, $M_{Ref}$ indicates a number of subframes with a PDSCH HARQ-ACK association for a reference configuration. For case A (e.g., if the set of DL subframes indicated by the SCell configuration is a subset of the DL subframes indicated by the PCell configuration) in approach A, the SCell may follow the PCell configuration. Thus, $M_{Ref}=M_{PCell}$ where $M_{PCell}$ is the M of the PCell (e.g., the number of (or special subframe, for example) and the SCell configuration includes an UL subframe. Thus, the corresponding HARQ-ACK bits may never be generated on the SCell or they may be reported as a DTX. For case C, m may be defined as the number of conflicting subframes (where the PCell configuration includes a DL subframe (or special subframe, for example) and the SCell configuration includes an UL subframe) in the set K defined in Table (3) associated with subframe n and the set K according to the reference configuration in Table (2).

In approach B, the $M_c$ of an SCell may be defined as $M_{Eff}$, where $M_{Eff}$ is the effective M of the reference configuration for which the PDSCH HARQ-ACK timing is followed excluding the conflicting subframes, where the PCell configuration or reference configuration includes a DL subframe (or special subframe, for example) and the SCell configuration includes an UL subframe (e.g., $M_{Eff}=M_{Ref}-m$). In other words, $M_{Ref}$ is a number of subframes with PDSCH HARQ-ACK associations for the reference configuration and m is a number of the conflicting subframes that are downlink subframes and special subframes in the reference configuration and uplink subframes in the SCell configuration.

In proposal I, the valid range that $W_{DAI}^{UL}$ represents may be based on the maximum $M_c$ of all cells. For TDD CA with different TDD configurations, the $W_{DAI}^{UL}$ may represent the maximum number of the total number of PDCCH(s) with assigned PDSCH transmission(s) and PDCCH indicating downlink SPS release among all configured cells. Therefore, the valid range that $W_{DAI}^{UL}$ represents may be based on the maximum $M_c$ of all cells. Denote $W_{max}$ as the maximum $M_c$ of all cells, $W_{max}=\max(M_c)$ of all cells. If a UL grant is issued from a cell with smaller $M_c$, the $W_{DAI}^{UL}$ value may be greater than the $M_c$ of the cell.

In a first case, if configuration 5 is not configured for any cell or is not used as the reference configuration of any cell, and the configurations of the cells that are TDD CA are limited to configurations {1, 2, 3, 4, 6}, for HARQ-ACK transmission in an UL subframe n and on PUSCH adjusted by an UL grant, a feedback factor $B_c^{DL}=\min(W_{DAI}^{UL}, M_c)$ if the timing reference configuration is one of {1, 2, 3, 4, 6}. For a cell with UL-DL configuration 0, $M_c$ may always be 1, thus $B_c^{DL}=1$. Especially, in the association set of the reference configuration of an SCell, there may be one or more subframes in the SCell that are configured as UL. It may be better to remove these subframes in the adjusted case. Thus, the $M_c$ may be the effective M (e.g., $M_{Eff}$).

In a second case, if configuration 5 is configured for a cell or configuration 5 is used as the reference configuration of a cell, for PDSCH HARQ-ACK reporting on PUSCH in subframe 2 (e.g., an UL subframe for configuration 5 is subframe 2), the $W_{DAI}^{UL}$ and HARQ-ACK bits of all cells may follow the same rule as in configuration 5. Therefore, if configuration 5 is configured for a cell or configuration 5 is used as the reference configuration of any cell in the TDD CA, for a cell in the for a PUSCH transmission adjusted based on a detected PDCCH with DCI format 0/4, the UE may assume that the feedback factor $$B_c^{DL} = \min\left(\left(W_{DAI}^{UL} + 4\left\lceil\frac{(U-W_{DAI}^{UL})}{4}\right\rceil\right), M_c\right),$$

where another feedback factor U denotes the maximum value of $U_c$ among all the configured serving cells, $U_c$ is the total number of received PDSCHs and PDCCH indicating downlink SPS release in subframe(s) n−k on the c-th serving cell and k∈K according to association set of the reference configuration in Table (2). For a cell with configuration 0, $M_c$ may always be 1, thus $B_c^{DL}=1$. Even for a cell with an UL-DL configuration {1, 2, 3, 4, 6}, if configuration 5 is used or is the reference configuration of any other cell, the $B_c^{DL}$ may be determined in accordance with the second case instead of the first case. Particularly, in the association set of the reference configuration of an SCell, there may be one or more subframes in the SCell that are configured as UL. It may be better to remove these subframes in the adjusted case. Thus, the $M_c$ may be the effective M (e.g., $M_{Eff}$).

Proposal II, given as follows, may enable determination of the $W_{DAI}^{UL}$ in an UL grant. For TDD CA with different TDD configurations, different cells may have different UL grant timings. It can be classified into two cases: case 1 and case 2.

In case 1, for HARQ-ACK transmission in an UL subframe n and on PUSCH adjusted by an UL grant in subframe n−4, (e.g., the UL grant is signaled 4 milliseconds (ms)) before the PUSCH transmission. Thus, the eNB knows the maximum number of PDSCH allocated for each cell, and can signal the same $W_{DAI}^{UL}$ used for all cells.

If configuration 5 is not used or not as reference configuration of any cells, for a cell with PUSCH transmission that is adjusted based on the UL grant, the $W_{DAI}^{UL}$ may be the maximum number of the total number of PDCCH(s) with assigned PDSCH transmission(s) and PDCCH indicating downlink SPS release among all configured cells according to their PDSCH association set based on the reference configuration in Table (2). If configuration 5 is used or as reference configuration of any cells, for a cell with PUSCH transmission that is adjusted based on the UL grant, let W' be the maximum number of the total number of PDCCH(s) with assigned PDSCH transmission(s) and PDCCH indicating downlink SPS release among all configured cells according to their PDSCH association set based on the reference configuration in Table (2). If W' is less than or equal to 4, $W_{DAI}^{UL}=W'$. If W' is greater than 4 and smaller than or equal to 8, $W_{DAI}^{UL}=W'-4$. If W'=9, $W_{DAI}^{UL}=W'-8$. In other words, $W_{DAI}^{UL}=(W'-1) \mod 4+1$.

In case 2, for UL-DL configurations {0, 1, 6}, for HARQ-ACK transmission in an UL subframe n and on PUSCH adjusted by an UL grant in subframe n−k, where k>4, there are some open issues. For example, how to determine the $W_{DAI}^{UL}$ in these cases is still an open issue. Some issues are described in connection with FIG. 6 and FIG. 7 below.

Define W as the maximum number of DL transmissions among the association sets of all cells according to Table (2) up to the given DL subframe that issues the UL grant. Define was the maximum number of DL subframes after the UL grant among the association sets of all cells. In procedure 1, the $W_{DAI}^{UL}$ of cell c may be determined by $W'=\min(W+w, W_{max})$, where $W_{max}$ is the maximum valid value of $W_{DAI}^{UL}$ as given before. Thus, the UL grant in a cell with association timing that is greater than 4 ms counts in all possible PDSCH transmissions in other cells after the given UL grant. Therefore, if multiple UL grants are signaled, the $W_{DAI}^{UL}$ of a later UL grant may be the same or smaller than the $W_{DAI}^{UL}$ of an earlier UL grant from another cell. The $W_{DAI}^{UL}$ may be determined by the eNB and signaled to the UE in each UL grant.

In procedure 2, the $W_{DAI}^{UL}$ of cell c may be determined by $W'=W$. Thus, the UL grant in a cell with association timing that is greater than 4 ms does not count possible PDSCH transmissions in other cells after the given UL grant. However, for a cell with PDSCH transmission detected by PDCCH or SPS after the UL grant of another cell, there are two approaches when the UE handles the $W_{DAI}^{UL}$ used for the cell during HARQ-ACK reporting. In the first approach, the UE may add the detected number of PDSCH transmissions and SPS if any. In the second approach, the UE may not feedback HARQ-ACK for the PDSCH transmissions after the UL grant for the HARQ-ACK reporting on PUSCH. The UE may follow the $W_{DAI}^{UL}$ of cell c to calculate $B_c^{DL}$. For example, in FIG. 6, suppose an UL grant is issued on the SCell in subframe 6 and no UL grant on the PCell in subframe 8. If a PDSCH is scheduled for the UE on the PCell in subframe 8, the UE does not include the HARQ-ACK of subframe 8 in the PUSCH of the SCell in subframe 2.

In both procedure 1 and 2, if configuration 5 is not used or not used as a reference configuration of any cells, for a cell with PUSCH transmission that is adjusted based on the UL grant, the $W_{DAI}^{UL}=W'$. If configuration 5 is used or is used as reference configuration of any cells, for a cell with PUSCH transmission that is adjusted based on the UL grant, if W' is less or equal to 4, $W_{DAI}^{UL}=W'$. If W' is greater than 4 and smaller or equal to 8, $W_{DAI}^{UL}=W'-4$. If W'=9, $W_{DAI}^{UL}=W'-8$. In other words, $W_{DAI}^{UL}=(W'-1)$ mod 4+1.

Proposal III, given as follows, may enable an UL grant from a cell with configuration 0. For an UL grant is issued by a cell with configuration 0, there is no $W_{DAI}^{UL}$ field in the DCI format 0/4 for configuration 0. Therefore, the procedures to determine the $W_{DAI}^{UL}$ and HARQ-ACK bits used for other cells in adjusted PUSCH reporting on a cell with configuration 0 may need to be specified.

In one procedure, the $M_c$ of the cell may be used, thus non-adjusted PUSCH reporting on a cell with configuration 0 may be used for HARQ-ACK bits for the cell and other cells. In another procedure, the UE sets the $W_{DAI}^{UL}$ value for an UL grant for configuration 0 to 4 and applies proposal I procedure to calculate a feedback factor $B_c^{DL}$ by using another feedback factor $W_{DAI}^{UL}$ value as 4. In yet another procedure, the DCI of configuration 0 may be modified to include two bits for $W_{DAI}^{UL}$ similar to other TDD UL-DL configurations. The UE may be configured based on RRC signaling implicitly or explicitly whether the UE needs to monitor the DCI format with $W_{DAI}^{UL}$ field or without the $W_{DAI}^{UL}$ field for configuration 0.

In yet another procedure, there are two cases. In a first case, an UL grant is triggered on a cell with configuration 0 for an UL subframe with HARQ-ACK association according to the reference configuration in Table (2), and no other UL grant is triggered from other cells that have been configured with other than TDD configuration 0. Thus, the HARQ-ACK may be reported on the PUSCH transmission of the cell with configuration 0. In this procedure, the $U_{DAI,c}$ may be used to determine the number of HARQ-ACK bits for cell c. For all TDD UL-DL configurations, denote $U_{DAI,c}$ as the total number of PDCCH(s) with assigned PDSCH transmission(s) and PDCCH indicating downlink SPS release detected by the UE within the subframe(s) n−k in serving cell c, where k∈K according to the PDSCH HARQ-ACK reporting reference configuration of serving cell c as shown in Table (2). Since the eNB knows how many PDSCHs may be transmitted to a UE, it may perform decoding assuming less than or equal to the expected number of HARQ-ACK bits.

As an example for the second procedure, assume an UL grant may be triggered for a UL subframe n by a cell with configuration 0 or configuration 0 as the reference configuration, for another cell with $M_c=4$, if $W_c=3$ subframes are used for PDSCH transmissions for the UE, the eNB expected HARQ-ACK feedback of $W_c=3$ subframes for the cell. However, the UE may miss the last PDCCH, thus the $U_{DAI,c}$ may be always the same or less than $W_c$, e.g., $M_c \geq W_c \geq U_{DAI,c}$. The eNB may decode based on the number of subframe less than or equal to $W_c$.

In a second case, an UL grant may be triggered on a cell with UL-DL configuration 0 for an UL subframe with HARQ-ACK association according to the reference configuration in Table (2), and one or more UL grants may be triggered from other cells that have been configured with an UL-DL configuration other than TDD configuration 0. The cell with configuration 0 has the lowest cell index. Thus, the HARQ-ACK may be reported on the PUSCH transmission of the cell with configuration 0. In this case, one or more $W_{DAI}^{UL}$ may be signaled by UL grant of other cells.

Thus, if configuration 5 is not used or not as reference configuration of any cells, for a cell with PUSCH transmission that may be adjusted based on the UL grant, The feedback factor $B_c^{DL}=\min(W_{DAI}^{UL}, M_c)$ if the timing reference configuration of cell c is $\{1, 2, 3, 4, 6\}$. If configuration 5 is used or is used as reference configuration of any cells, for a cell with PUSCH transmission that may be adjusted based on the UL grant, the feedback factor $$B_c^{DL} = \min\left(\left(W_{DAI}^{UL} + 4\left\lceil\frac{(U - W_{DAI}^{UL})}{4}\right\rceil\right), M_c\right)$$

if configuration 5 is used or is used as reference configuration of any cells and the timing reference configuration of cell c is $\{1, 2, 3, 4, 5, 6\}$. For a cell with UL-DL configuration 0, $M_c$ may always be 1. Thus $B_c^{DL}=1$.

Proposal IV enables handling of multiple UL grants from multiple cells with different timing. If multiple UL grants are issued from multiple cells with the same UL timing, the same $W_{DAI}^{UL}$ may be signaled in all UL grants. Furthermore, the UE may use the given $W_{DAI}^{UL}$ or all cells. However, if the UL grant timings of different cells are different, the UL grants may signal the same or different $W_{DAI}^{UL}$ values as explained below.

Figure 7:
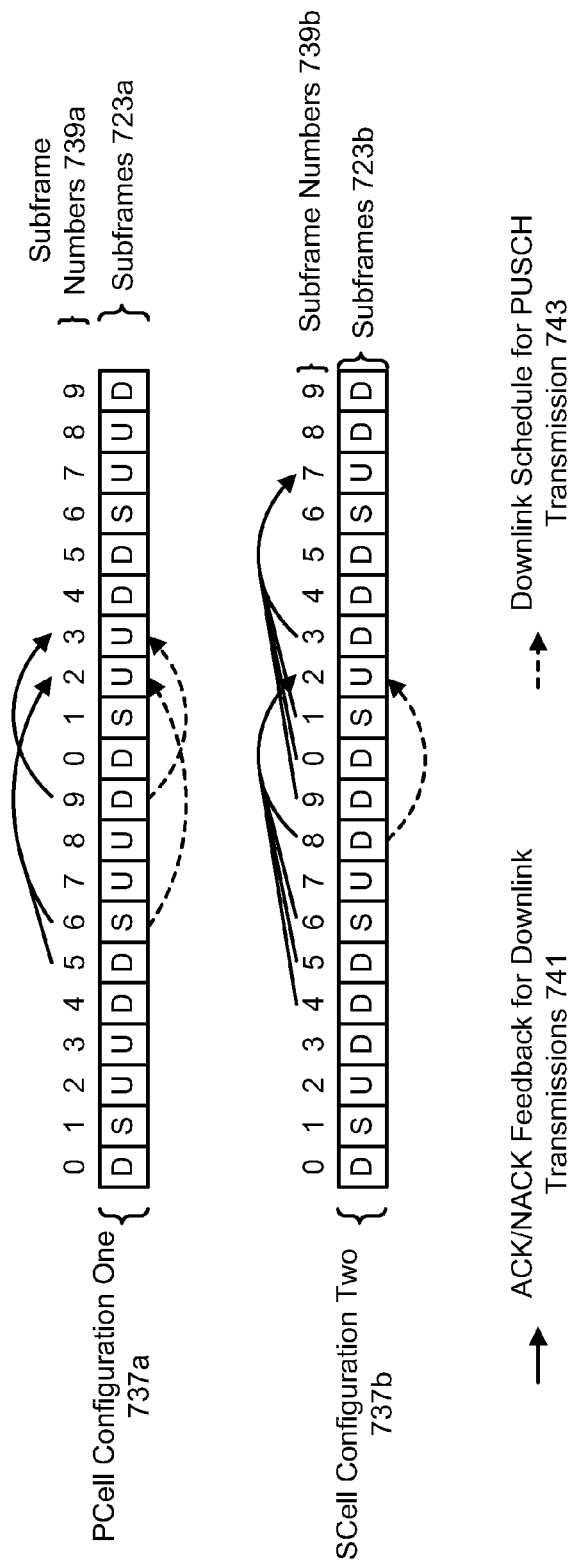
FIG. 7 is a diagram illustrating another example of a PCell configuration and an SCell configuration.

As another issue, suppose an UL grant may be issued on the SCell in subframe 6 and another UL grant on the PCell in subframe 8. Two $W_{DAI}^{UL}$ may be signaled in two different UL grants. They may be the same or different depending on how is $W_{DAI}^{UL}$ is defined. The same issue exists as illustrated in FIG. 7 if UL grants are signaled in both subframe 6 on PCell and subframe 8 on SCell. However, when a determined PUSCH transmission is adjusted with an UL grant, only one $W_{DAI}^{UL}$ value may be used for all cells. The systems and methods disclosed herein provide several approaches to handle this.

In approach 1, the $W_{DAI}^{UL}$ of the UL grant of the cell with HARQ-ACK reporting in the PUSCH transmission may be used. This provides a simple solution where the UE follows the value on the PUSCH transmission with the lowest cell index number that signals an UL grant. In approach 2, the $W_{DAI}^{UL}$ of the cell with the latest UL grant for the given subframe may be used. The latest $W_{DAI}^{UL}$ includes the information of all previous UL grants associated with the given UL subframe. Thus, it may provide the most accurate estimation of PDSCH transmissions in all cells. In approach 3, the maximum $W_{DAI}^{UL}$ of all cells may be used. This is a more conservative procedure. It trades off simplicity with potentially higher overhead for HARQ-ACK multiplexing on PUSCH. In another approach, a cell without an UL grant may determine the $W_{DAI}^{UL}$ based on one of the approaches above, and each cell that issues an UL grant follows its own $W_{DAI}^{UL}$ value.

In proposal V, $W_{DAI}^{UL}$ in an UL grant may be disabled for PUSCH transmission in an UL without PDSCH HARQ-ACK association. Furthermore, an UL grant may be triggered in subframe 9 on an SCell for PUSCH transmission on an SCell in subframe 3 of the next radio frame, but no HARQ-ACK may be reported in subframe 3. Thus, the $W_{DAI}^{UL}$ in the UL grant may be meaningless. Thus, in an UL grant that is scheduled for PUSCH transmission in an UL subframe without a HARQ-ACK association according to the reference configuration in Table (2), the $W_{DAI}^{UL}$ may be disabled or ignored by the UE.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more eNBs 160 and one or more UEs 102 in which systems and methods for sending and receiving feedback information may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of UL-DL configurations 128, a UE UL-DL configuration determination module 130, a HARQ-ACK generation module 132, a UE feedback factor determination module 134, a UE feedback parameter determination module 126 and a format application module 184.

The UL-DL configurations 128 may specify a set of UL-DL configurations that may be used for communication between the UE 102 and the eNB 160. Examples of UL-DL configurations include the UL-DL configurations 0-6 illustrated in Table (1) above. The UL-DL configurations 128 may specify UL, DL and special subframes for communication with the eNB(s) 160. For example, the UL-DL configurations 128 may indicate DL subframes for the UE 102 to receive information from the eNB 160 and may indicate UL subframes for the UE 102 to transmit information to the eNB 160. For proper communication on a cell, the UE 102 and the eNB 160 may apply the same UL-DL configuration 128 on the same cell. However, different UL-DL configurations 128 may be applied on different cells (e.g., PCell and SCell(s)).

The UL-DL configurations 128 may also indicate PDSCH HARQ-ACK associations (as illustrated in Table (3) above, for example). A PDSCH HARQ-ACK association may specify a particular (PDSCH HARQ-ACK) timing for sending HARQ-ACK information corresponding to a PDSCH. For example, the HARQ-ACK generation module 132 may generate HARQ-ACK information corresponding to a PDSCH based on whether a signal (e.g., data) in the PDSCH was correctly received or not. A PDSCH HARQ-ACK association may specify a reporting subframe in which the UE 102 reports (e.g., transmits) the HARQ-ACK information corresponding to the PDSCH. The reporting subframe may be determined based on the subframe that includes the PDSCH.

The UE UL-DL configuration determination module 130 may determine which of the UL-DL configuration(s) 128 for the UE 102 to apply for one or more cells. For example, the UE 102 may receive one or more RRC configuration (e.g., SIB-1 broadcasted information or dedicated signaling) indicating UL-DL configuration(s) 128 for a PCell and for one or more SCells. For instance, a PCell and an SCell may be utilized in carrier aggregation. The UE UL-DL configuration determination module 130 may determine which UL-DL configuration 128 is assigned to the PCell and which UL-DL configuration 128 is assigned to the SCell. The UL-DL configurations 128 for the PCell and SCell(s) may be the same or different.

The UE feedback factor determination module 134 may determine feedback factors (e.g., $B_c^{DL}$, U, $W_{DAI}^{UL}$). For example, the UE feedback factor determination module 134 may determine feedback factors $B_c^{DL}$, where $B_c^{DL}$ is the number of downlink subframes to feed back HARQ-ACK bits for a c-th serving cell. Additionally or alternatively, the UE feedback factor determination module 134 may determine a feedback factor U, where U denotes a maximum value of $U_c$ among all configured serving cells, where $U_c$ is the total number of received PDSCHs and PDCCH indicating a downlink semi-persistent scheduling (SPS) release on a c-th serving cell.

The feedback factors may indicate (e.g., be utilized to determine) a number of subframes and HARQ-ACK bits to be reported for one or more cells in a PUSCH transmission adjusted based on a detected PDCCH with DCI format 0/4, for example. In some implementations, the UE 102 receives one or more feedback factors (e.g., $W_{DAI}^{UL}$) in one or more uplink (UL) grants. The UE feedback factor determination module 134 may determine one or more feedback factors in accordance with one or more of the proposals, approaches, cases, procedures, etc., described above.

A UE reporting subframe determination module (not shown in FIG. 1) may determine a reporting subframe for sending HARQ-ACK information. For example, the UE reporting subframe determination module may determine a HARQ-ACK reporting subframe in which the UE 102 sends SCell HARQ-ACK information (e.g., PDSCH HARQ-ACK information corresponding to an SCell). For example, the UE reporting subframe determination module may determine a reporting subframe for sending SCell HARQ-ACK information on the PCell according to the timing reference described above in Table (3). For instance, Table (3) above (e.g., the PDSCH HARQ-ACK association table) gives the location of a corresponding PDSCH by the index set K:$\{k_0, k_1, \ldots, k_{M-1}\}$ for a subframe (e.g., UL subframe) number n, where the HARQ-ACK of a PDSCH in subframe n−k (e.g., n−$k_1$) is reported in UL subframe n. The UE 102 may send the SCell HARQ-ACK information in the determined HARQ-ACK reporting subframe.

The UE feedback parameter determination module 126 may determine one or more feedback parameters corresponding to one or more cells (e.g., PCell, SCell(s)). For example, the UE feedback parameter determination module 126 may determine a feedback parameter $M_c$ for one or more cells c. This determination may be accomplished as described above, for example. In some implementations, the determination may be based on one or more of a PCell configuration, an SCell configuration, a reference configuration, a number of conflicting subframes and a feedback parameter determination scheme.

The format application module 184 may apply a particular format to the HARQ-ACK information in certain cases. For example, the format application module 184 may format HARQ-ACK information in accordance with a number of subframes and HARQ-ACK bits indicated by the one or more feedback factors. In particular, the format application module 184 may apply one or more of the proposals, approaches, procedures, ways and techniques described above.

In some implementations, the UE 102 may receive a selection scheme indicator from the eNB 160. For example, the selection scheme indicator may specify one or more of the proposals, approaches, procedures, ways and techniques described above. The format application module 184 may apply a particular format in accordance with the specified one or more of the proposals, approaches, procedures, ways and techniques described above. This may allow the UE 102 and the eNB 160 to utilize the same selection scheme in implementations where multiple selection schemes may be applied.

The UE operations module 124 may provide information 148 to the one or more receivers 120. For example, the UE operations module 124 may inform the receiver(s) 120 when or when not to receive transmissions based on the UL-DL configurations 128.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some configurations, this may be based on a UL-DL configuration 128. For instance, the one or more transmitters 158 may transmit during an UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of UL-DL configurations 194, an eNB feedback factor determination module 198, an eNB UL-DL configuration determination module 196, an eNB feedback parameter determination module 151 and an interpreter 107. In some implementations, the eNB operations module 182 may also include a scheme signaling module 153.

The UL-DL configurations 194 may specify a set of UL-DL configurations that may be used for communication between the eNB 160 and the UE(s) 102. Examples of UL-DL configurations 194 include the UL-DL configurations 0-6 illustrated in Table (1) above. The UL-DL configurations 194 may specify UL and DL subframes for communication with the UE(s) 102. For example, the UL-DL configurations 194 may indicate DL subframes for the eNB 160 to send information to the UE(s) 102 and may indicate UL subframes for the eNB 160 to receive information from the UE(s) 102. For proper communication on a cell, the UE 102 and the eNB 160 may apply the same UL-DL configuration 194 on the same cell. However, different UL-DL configurations 194 may be applied on different cells (e.g., PCell and SCell(s)).

The UL-DL configurations 194 may also indicate PDSCH HARQ-ACK associations (as illustrated in Table (3), for example). A PDSCH HARQ-ACK association may specify a particular (PDSCH HARQ-ACK) timing for receiving HARQ-ACK information corresponding to a PDSCH. A PDSCH HARQ-ACK association may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

The eNB UL-DL configuration determination module 196 may determine which of the UL-DL configuration(s) 194 for the UE 102 to apply for one or more cells. For example, the eNB 160 may send one or more RRC configuration (e.g., SIB-1 broadcasted information or dedicated signaling) indicating UL-DL configuration(s) 194 for a PCell and for one or more SCells. For instance, a PCell and an SCell may be utilized in carrier aggregation. The eNB UL-DL configuration determination module 196 may assign UL-DL configuration(s) 194 to the PCell and to the SCell. The eNB 160 may signal one or more of these assignments to a UE 102. The UL-DL configurations 194 for the PCell and SCell(s) may be the same or different.

The eNB feedback factor determination module 198 may determine feedback factors (e.g., $B_c^{DL}$, U, $W_{DAI}^{UL}$). For example, the eNB feedback factor determination module 198 may determine feedback factors $B_c^{DL}$, where $B_c^{DL}$ is the number of downlink subframes to feed back HARQ-ACK bits for a c-th serving cell. Additionally or alternatively, the eNB feedback factor determination module 198 may determine a feedback factor U, where U denotes a maximum value of $U_c$ among all configured serving cells, where $U_c$ is the total number of received PDSCHs and PDCCH indicating a downlink semi-persistent scheduling (SPS) release on a c-th serving cell.

The feedback factors may indicate (e.g., be utilized to determine) a number of subframes and HARQ-ACK bits to be reported for one or more cells in a PUSCH transmission adjusted based on a detected PDCCH with DCI format 0/4, for example. In some implementations, the eNB 160 sends one or more feedback factors (e.g., $W_{DAI}^{UL}$) in one or more uplink (UL) grants. The eNB feedback factor determination module 198 may determine one or more feedback factors in accordance with one or more of the proposals, approaches, cases, procedures, etc., described above.

An eNB reporting subframe determination module (not shown in FIG. 1) may determine a reporting subframe for receiving HARQ-ACK information. For example, the eNB reporting subframe determination module may determine a HARQ-ACK reporting subframe in which the eNB 160 receives SCell PDSCH HARQ-ACK information (e.g., PDSCH HARQ-ACK information corresponding to an SCell) from a UE 102. For example, the eNB reporting subframe determination module may determine a reporting subframe for receiving SCell HARQ-ACK information on the PCell according to the timing reference described above in Table (3). For instance, Table (3) above (e.g., the PDSCH HARQ-ACK association table) gives the location of a corresponding PDSCH by the index set K:{$k_0$, $k_1$, . . . , $k_{M-1}$}, for a subframe (e.g., UL subframe) number n, where the HARQ-ACK of a PDSCH in subframe n-k (e.g., n-$k_1$) is reported in UL subframe n. The eNB 160 may receive the SCell HARQ-ACK information in the determined HARQ-ACK reporting subframe.

The eNB feedback parameter determination module 151 may determine one or more feedback parameters corresponding to one or more cells (e.g., PCell, SCell(s)). For example, the eNB feedback parameter determination module 151 may determine a feedback parameter $M_c$ for one or more cells c. This determination may be accomplished as described above (and in connection with FIG. 3, for instance), for example. In some implementations, the determination may be based on one or more of a PCell configuration, an SCell configuration, a reference configuration, a number of conflicting subframes and a feedback parameter determination scheme.

The optional scheme signaling module 153 may generate one or more of a feedback parameter determination scheme indicator and a selection scheme indicator. In some implementations, one of multiple feedback parameter determination schemes may be utilized. In these implementations, the eNB 160 may signal which scheme is utilized. For example, the eNB 160 may send a feedback parameter determination scheme indicator that indicates whether the feedback parameter (e.g., $M_c$) is determined based on a reference parameter (e.g., $M_{Ref}$) or based on the reference parameter and a number of conflicting subframes (e.g., $M_{Eff}=M_{Ref}-m$). In other implementations, only one feedback parameter determination scheme may be utilized by the eNB 160 and UE 102. In these implementations, the eNB 160 may not signal a feedback parameter determination scheme.

Additionally or alternatively, in some implementations, one of multiple selection schemes may be utilized. In these implementations, the eNB 160 may signal which scheme is utilized. For example, the eNB 160 may send a selection scheme indicator that indicates one or more of the proposals, approaches, cases, procedures, etc., described above (for application by the UE 102 in determining feedback factor(s), for example). In other implementations, only one selection scheme may be utilized by the eNB 160 and UE 102. In these implementations, the eNB 160 may not signal a selection scheme.

The interpreter 107 may interpret formats of the HARQ-ACK information in certain cases. For example, the interpreter 107 may interpret HARQ-ACK information based on one or more feedback factors. For instance, the feedback factors may be used to determine a number of subframes and HARQ-ACK bits for receipt from the UE 102. For instance, the interpreter 107 may interpret received HARQ-ACK information in accordance with one or more of the proposals, approaches, procedures, techniques and ways described above.

The eNB operations module 182 may provide information 190 to the one or more receivers 178. For example, the eNB operations module 182 may inform the receiver(s) 178 when or when not to receive transmissions based on a UL-DL configuration 194 for a given cell.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. The other information 101 may include one or more of RRC configuration (e.g., SIB-1 broadcasted information or dedicated signaling) (e.g., PCell configuration indicator, SCell configuration indicator), a channel scheme determination indicator and a feedback parameter determination scheme indicator, for example.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on an UL-DL configuration 194. The one or more transmitters 117 may upconvert and transmit the modulated signal(s) 115 to one or more UEs 102.

It should be noted that a DL subframe may be transmitted from the eNB 160 to one or more UEs 102 and that an UL subframe may be transmitted from one or more UEs 102 to the eNB 160. Furthermore, both the eNB 160 and the one or more UEs 102 may transmit data in a standard special subframe.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
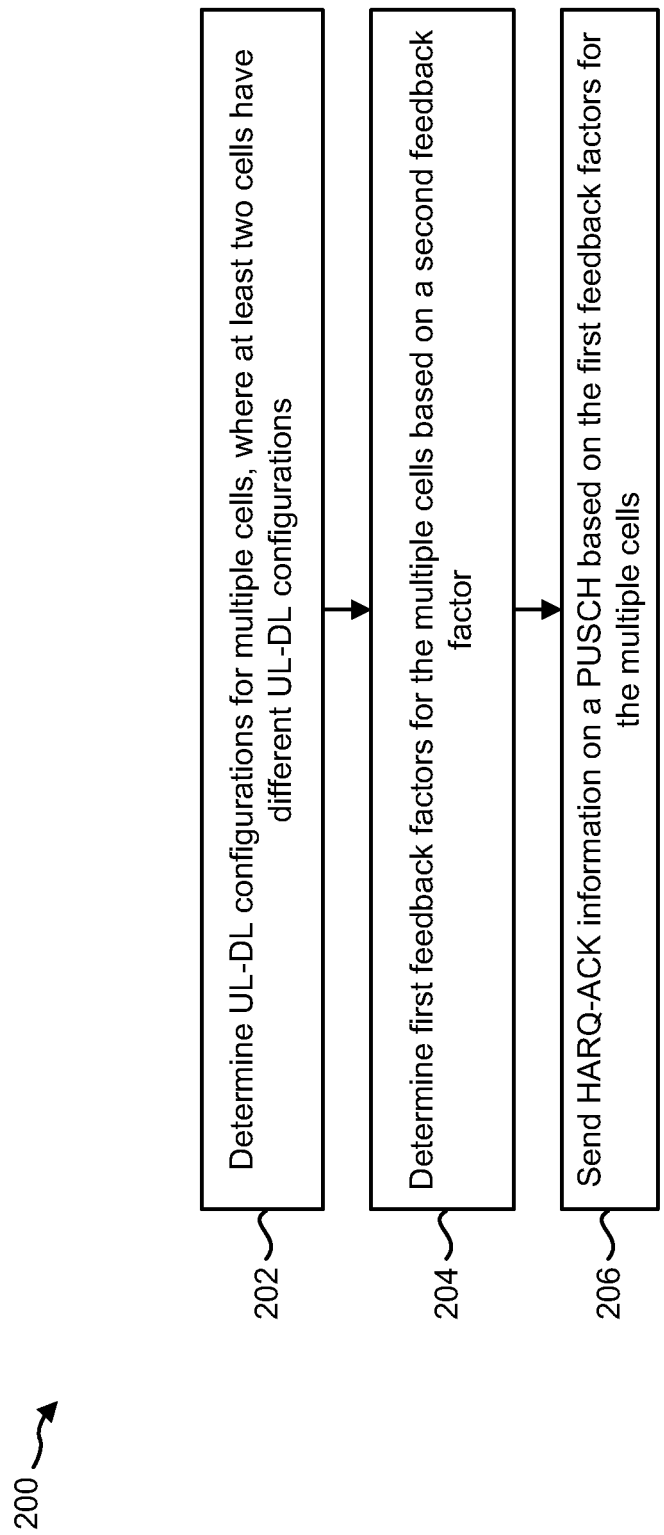
FIG. 2 is a flow diagram illustrating one configuration of a method for sending feedback information by a UE.

FIG. 2 is a flow diagram illustrating one configuration of a method 200 for sending feedback information by a UE 102. A UE 102 may determine 202 UL-DL configurations for multiple cells, where at least two cells have different UL-DL configurations. For example, the UE 102 may receive one or more RRC configuration (e.g., SIB-1 broadcasted information or dedicated signaling) indicating UL-DL configuration(s) 128 for a PCell and for one or more SCells. For instance, a PCell and an SCell may be utilized in carrier aggregation. The UE UL-DL configuration determination module 130 may determine which UL-DL configuration 128 is assigned to the PCell and which UL-DL configuration 128 is assigned to the SCell. The UL-DL configurations 128 for the PCell and SCell(s) may be the same or different.

The UE 102 may determine 204 first feedback factors (e.g., $B_c^{DL}$) for the multiple cells based on a second feedback factor (e.g., $W_{DAI}^{UL}$). Determining 204 the first feedback factors may be further based on a third feedback factor (e.g., U) if UL-DL configuration 5 is configured for at least one of the multiple cells or is a reference configuration for at least one of the multiple cells. For example, the UE 102 may determine 204 first feedback factors $B_c^{DL}$ in accordance with one or more of the proposals, cases, approaches, procedures, etc., described above.

The UE 102 may send 206 HARQ-ACK information on a PUSCH based on the first feedback factors (e.g., $B_c^{DL}$) for the multiple cells. For example, the first feedback factors $B_c^{DL}$ may be utilized to determine a number of subframes and HARQ-ACK bits for transmission to an eNB 160.

Figure 3:
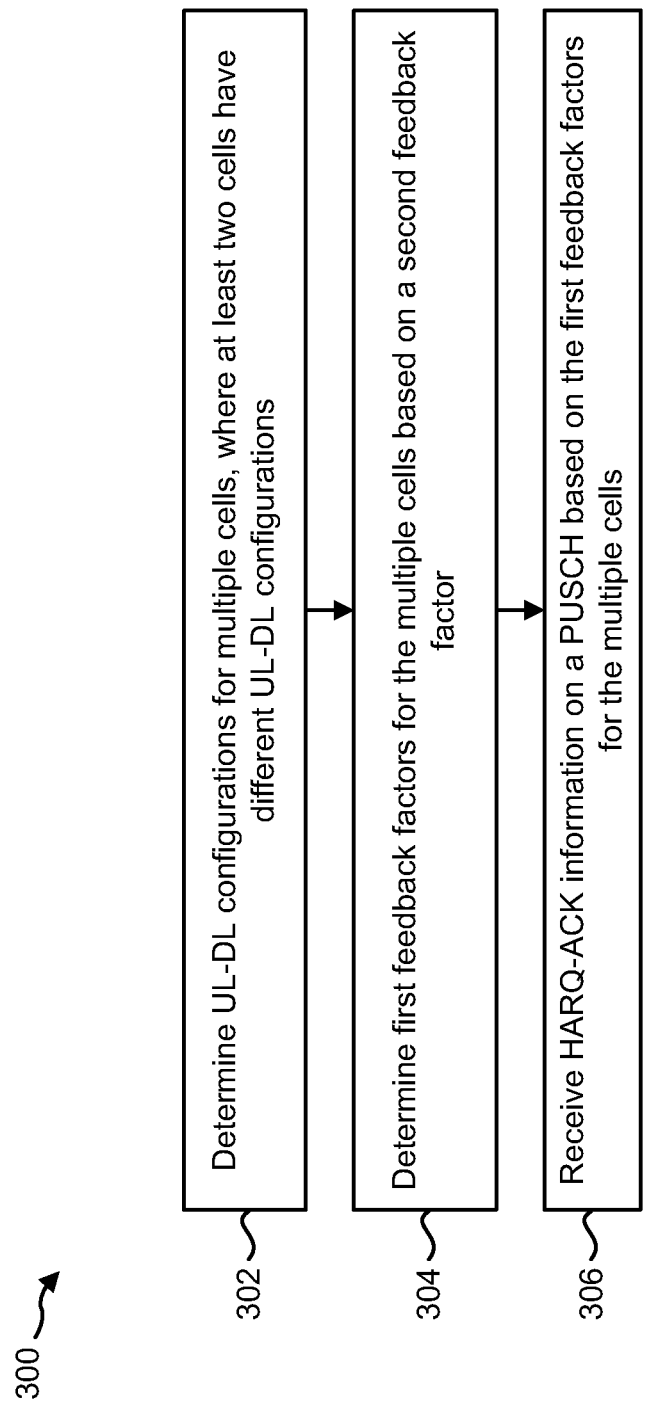
FIG. 3 is a flow diagram illustrating one configuration of a method for receiving feedback information by an eNB.

FIG. 3 is a flow diagram illustrating one configuration of a method 300 for receiving feedback information by a eNB 106. A eNB 106 may determine 302 UL-DL configurations for multiple cells, where at least two cells have different UL-DL configurations. For example, the eNB 106 may send one or more RRC configuration (e.g., SIB-1 broadcasted information or dedicated signaling) indicating UL-DL configuration(s) 128 for a PCell and for one or more SCells. For instance, a PCell and an SCell may be utilized in carrier aggregation. The UE UL-DL configuration determination module 130 may determine which UL-DL configuration 128 is assigned to the PCell and which UL-DL configuration 128 is assigned to the SCell. The UL-DL configurations 128 for the PCell and SCell(s) may be the same or different.

The eNB 106 may determine 304 first feedback factors (e.g., $B_c^{DL}$) for the multiple cells based on a second feedback factor (e.g., $W_{DAI}^{UL}$). Determining 304 the first feedback factors may be further based on a third feedback factor (e.g., U) if UL-DL configuration 5 is configured for at least one of the multiple cells or is a reference configuration for at least one of the multiple cells. For example, the eNB 106 may determine 304 first feedback factors $B_c^{DL}$ in accordance with one or more of the proposals, cases, approaches, procedures, etc., described above.

The eNB 106 may receive 306 HARQ-ACK information on a PUSCH based on the first feedback factors (e.g., $B_c^{DL}$) for the multiple cells. For example, the first feedback factors $B_c^{DL}$ may be utilized to determine a number of subframes and HARQ-ACK bits for reception from a UE 102.

Figure 4:
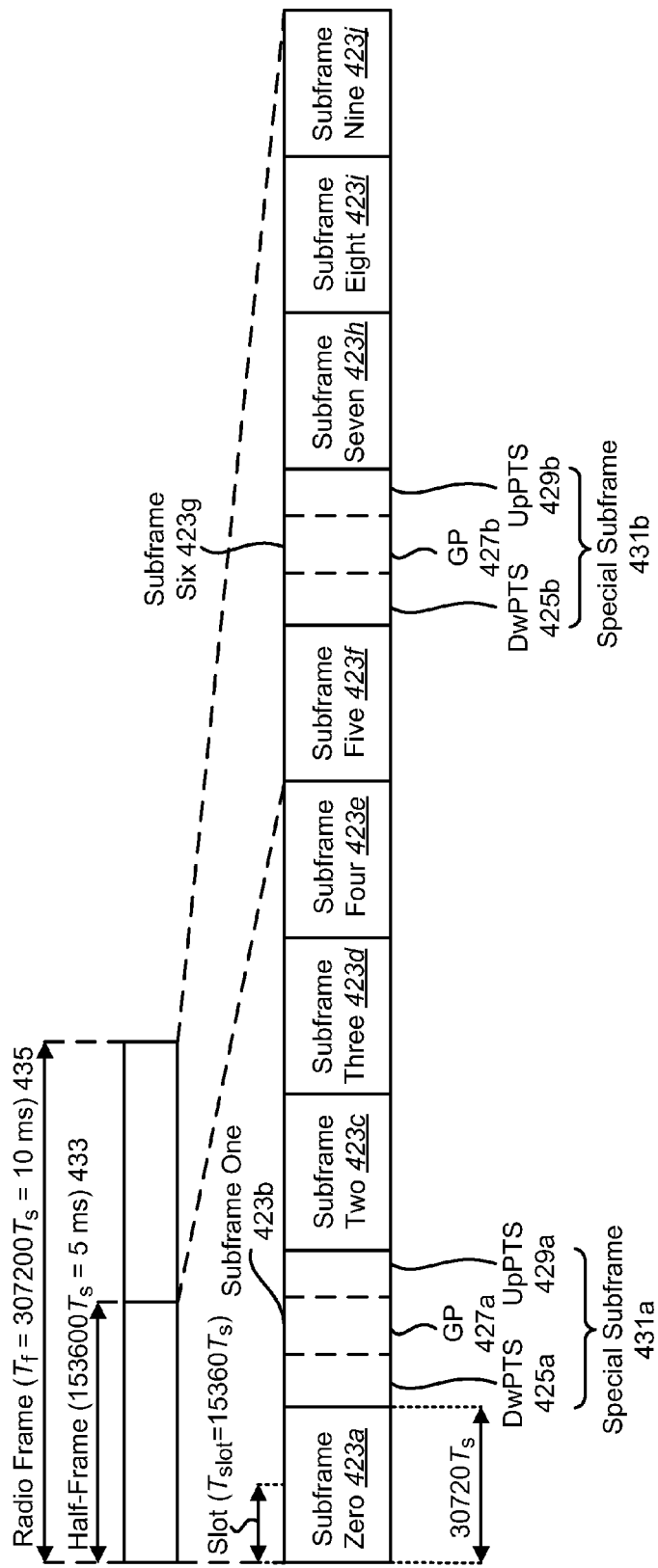
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure may be applicable in TDD approaches. Each radio frame 435 may have a length of $T_f=307200 \cdot T_s=10$ ms, where $T_f$ is a radio frame 435 duration and $T_s$ is a time unit equal to $$\frac{1}{(15000 \times 2048)}$$

seconds. The radio frame 435 may include two half-frames 433, each having a length of $153600 \cdot T_s=5$ ms. Each half-frame 433 may include five subframes 423a-e, 423f-j each having a length of $30720 \cdot T_s=1$ ms.

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (4) (from Table 4.2-1 of 3GPP TS 36.211) subject to the total length of DwPTS, GP and UpPTS being equal to $30720 \cdot T_s=1$ ms. Table (4) illustrates several configurations of (standard) special subframes. Each subframe i is defined as two slots, 2i and 2i+1 of length $T_{slot}=15360 \cdot T_s=0.5$ ms in each subframe. In Table (4), "cyclic prefix" is abbreviated as "CP" and "configuration" is abbreviated as "Config" for convenience.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (5) above) subject to the total length of each set of DwPTS 425, GP 427 and UpPTS 429 being equal to $30720 \cdot T_s=1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot}=15360 \cdot T_s=0.5$ ms in each subframe 423. For example, subframe zero (e.g., 0) 423a may include two slots, including a first slot.

UL-DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 433 includes a standard special subframe 431a-b. In the case of 10 ms downlink-to-uplink switch-point periodicity, a special subframe may exist in the first half-frame 433 only.

Subframe zero (e.g., 0) 423a and subframe five (e.g., 5) 423f and DwPTS 425a-b may be reserved for downlink transmission. The UpPTS 429a-b and the subframe(s) immediately following the special subframe(s) 431a-b (e.g.,

TABLE (4)

| Special Subframe Config | Normal CP in downlink | | | Extended CP in downlink | | |
| --- | --- | --- | --- | --- | --- | --- |
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

subframe two 423c and subframe seven 423h) may be reserved for uplink transmission. It should be noted that, in some implementations, special subframes 431 may be considered DL subframes in order to determine a number of conflicting subframes.

Figure 5:
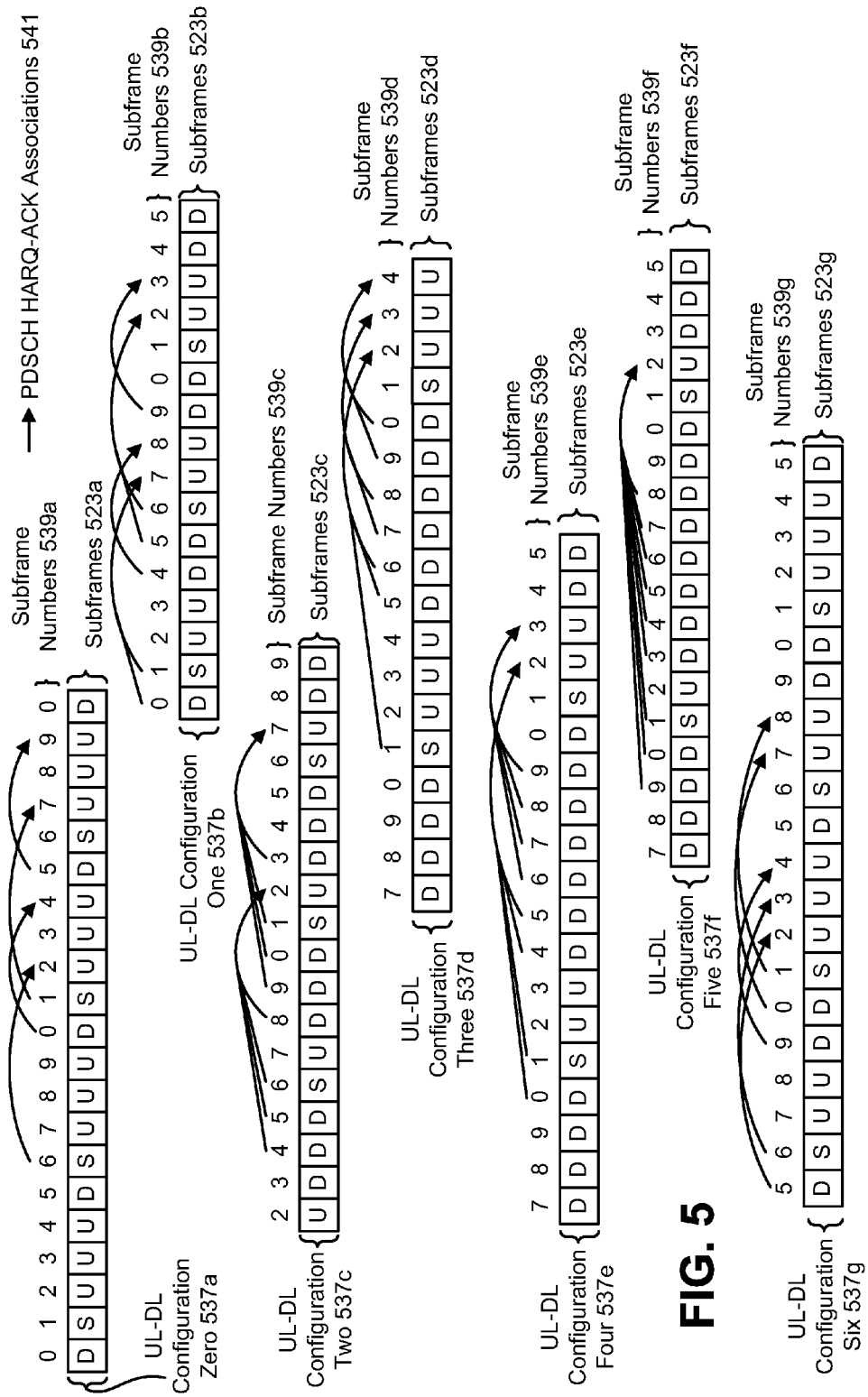
FIG. 5 is a diagram illustrating some UL-DL configurations in accordance with the systems and methods described herein.

FIG. 5 is a diagram illustrating some UL-DL configurations 537a-g in accordance with the systems and methods described herein. In particular, FIG. 5 illustrates UL-DL configuration zero 537a (e.g., "UL-DL configuration 0") with subframes 523a and subframe numbers 539a, UL-DL configuration one 537b (e.g., "UL-DL configuration 1") with subframes 523b and subframe numbers 539b, UL-DL configuration two 537c (e.g., "UL-DL configuration 2") with subframes 523c and subframe numbers 539c and UL-DL configuration three 537d (e.g., "UL-DL configuration 3") with subframes 523d and subframe numbers 539d. FIG. 5 also illustrates UL-DL configuration four 537e (e.g., "UL-DL configuration 4") with subframes 523e and subframe numbers 539e, UL-DL configuration five 537f (e.g., "UL-DL configuration 5") with subframes 523f and subframe numbers 539f and UL-DL configuration six 537g (e.g., "UL-DL configuration 6") with subframes 523g and subframe numbers 539g.

FIG. 5 further illustrates PDSCH HARQ-ACK associations 541 (e.g., PDSCH HARQ-ACK feedback on PUCCH or PUSCH associations). The PDSCH HARQ-ACK associations 541 may indicate HARQ-ACK reporting subframes corresponding to subframes for PDSCH transmissions (e.g., subframes in which PDSCH transmissions may be sent and/or received). It should be noted that some of the radio frames illustrated in FIG. 5 have been truncated for convenience.

The systems and methods disclosed herein may be applied to one or more of the UL-DL configurations 537a-g illustrated in FIG. 5. For example, one or more PDSCH HARQ-ACK associations 541 corresponding to one of the UL-DL configurations 537a-g illustrated in FIG. 5 may be applied to communications between a UE 102 and eNB 160. For example, an UL-DL configuration 537 may be determined (e.g., assigned to, applied to) a PCell. In this case, PDSCH HARQ-ACK associations 541 may specify PDSCH HARQ-ACK timing (e.g., a HARQ-ACK reporting subframe) for HARQ-ACK feedback transmissions corresponding to the PCell. For SCell HARQ-ACK feedback transmissions, the PDSCH HARQ-ACK associations 541 corresponding to a reference UL-DL configuration in accordance with the feedback parameters may be utilized. In some instances, the PDSCH HARQ-ACK information may be formatted and reported in an uplink subframe based on Format 1b with channel selection as described above.

Figure 6:
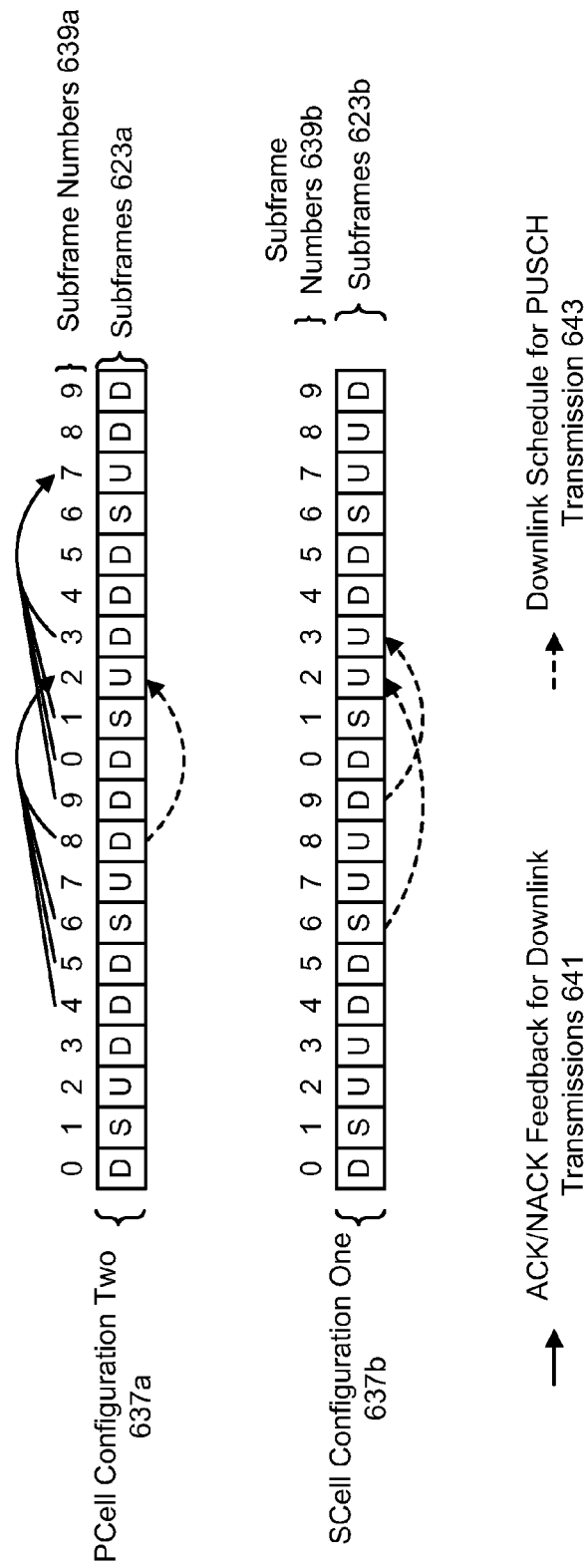
FIG. 6 is a diagram illustrating an example of a primary cell (PCell) configuration and a secondary cell (SCell) configuration.

FIG. 6 is a diagram illustrating an example of a PCell configuration and an SCell configuration. In particular, FIG. 6 illustrates PCell configuration 2 (e.g., "two") 637a with subframes 623a and subframe numbers 639a in addition to SCell configuration 1 (e.g., "one") 637b with subframes 623b and subframe numbers 639b. Furthermore, ACK/NACK feedback for downlink transmission associations 641 and downlink schedule for PUSCH transmission associations 643 are illustrated.

The example illustrated in FIG. 6 is an example of different UL grant timing. In particular, FIG. 6 shows an example with a PCell configured with UL-DL configuration 2 and an SCell with UL-DL configuration 1. The PDSCH HARQ-ACK of the SCell follows the PCell timing in this case. However, the SCell follows its own UL grant (e.g., the PUSCH scheduling timing).

As an issue in FIG. 6, suppose an UL grant is issued on the SCell in subframe 6 and no UL grant on the PCell in subframe 8. In subframe 6, when the UL grant on SCell is issued, the eNB may not know in advance if the PDSCH will be scheduled for the UE on the PCell in subframe 8. Thus, eNB may not know whether subframe 8 should be included in the $W_{DAI}^{UL}$ on the UL grant in subframe 6.

FIG. 7 is a diagram illustrating another example of a PCell configuration and an SCell configuration. In particular, FIG. 7 illustrates PCell configuration 1 (e.g., "one") 737a with subframes 723a and subframe numbers 739a in addition to SCell configuration 2 (e.g., "two") 737b with subframes 723b and subframe numbers 739b. Furthermore, ACK/NACK feedback for downlink transmission associations 741 and downlink schedule for PUSCH transmission associations 743 are illustrated.

The example in FIG. 7 is another example of different UL grant timing. In particular, in this example, the same issue (as described above in FIG. 6) exists if the PCell has an UL grant in subframe 6 and no UL grant from SCell. For example, the PCell is configured with configuration 1 and the SCell with configuration 2. The PCell and SCell follow their own PDSCH and PUSCH timing, and are different from each other.

Figure 8:
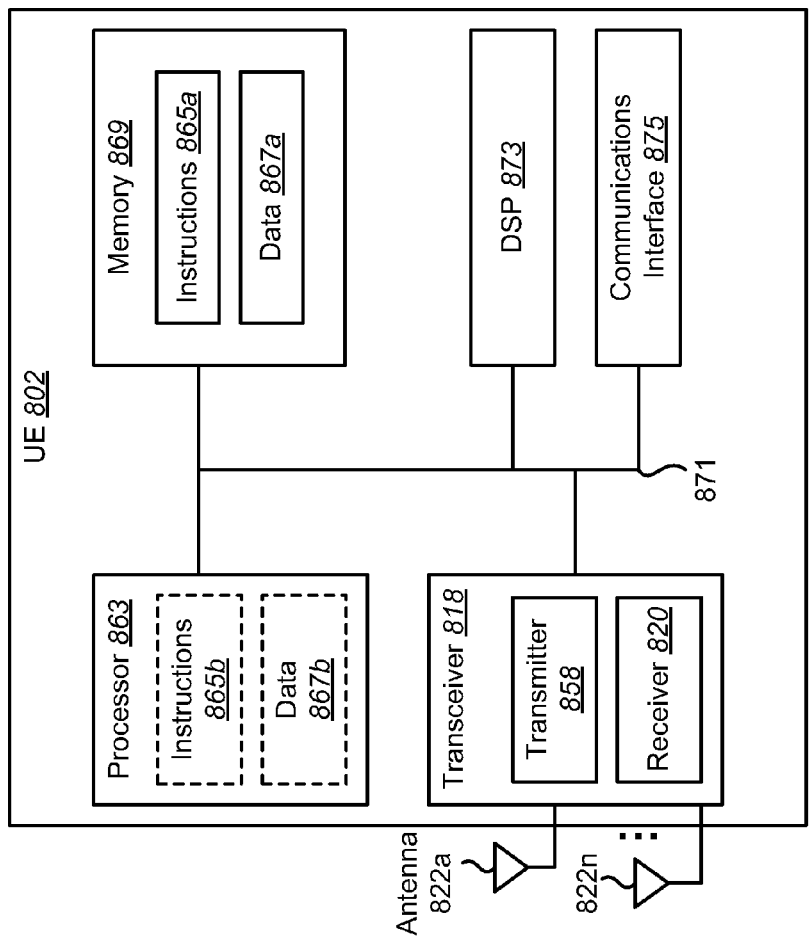
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1. The UE 802 includes a processor 863 that controls operation of the UE 802. The processor 863 may also be referred to as a central processing unit (CPU). Memory 869, which may include read-only memory (ROM), random access memory (RAM), a combination of the two or any type of device that may store information, provides instructions 865a and data 867a to the processor 863. A portion of the memory 869 may also include non-volatile random access memory (NVRAM). Instructions 865b and data 867b may also reside in the processor 863. Instructions 865b and/or data 867b loaded into the processor 863 may also include instructions 865a and/or data 867a from memory 869 that were loaded for execution or processing by the processor 863. The instructions 865b may be executed by the processor 863 to implement the method 200 described above.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822a-n are attached to the housing and electrically coupled to the transceiver 818.

The various components of the UE 802 are coupled together by a bus system 871, which may include a power bus, a control signal bus and a status signal bus, in addition to a data bus. However, for the sake of clarity, the various buses are illustrated in FIG. 8 as the bus system 871. The UE 802 may also include a digital signal processor (DSP) 873 for use in processing signals. The UE 802 may also include a communications interface 875 that provides user access to the functions of the UE 802. The UE 802 illustrated in FIG. 8 is a functional block diagram rather than a listing of specific components.

Figure 9:
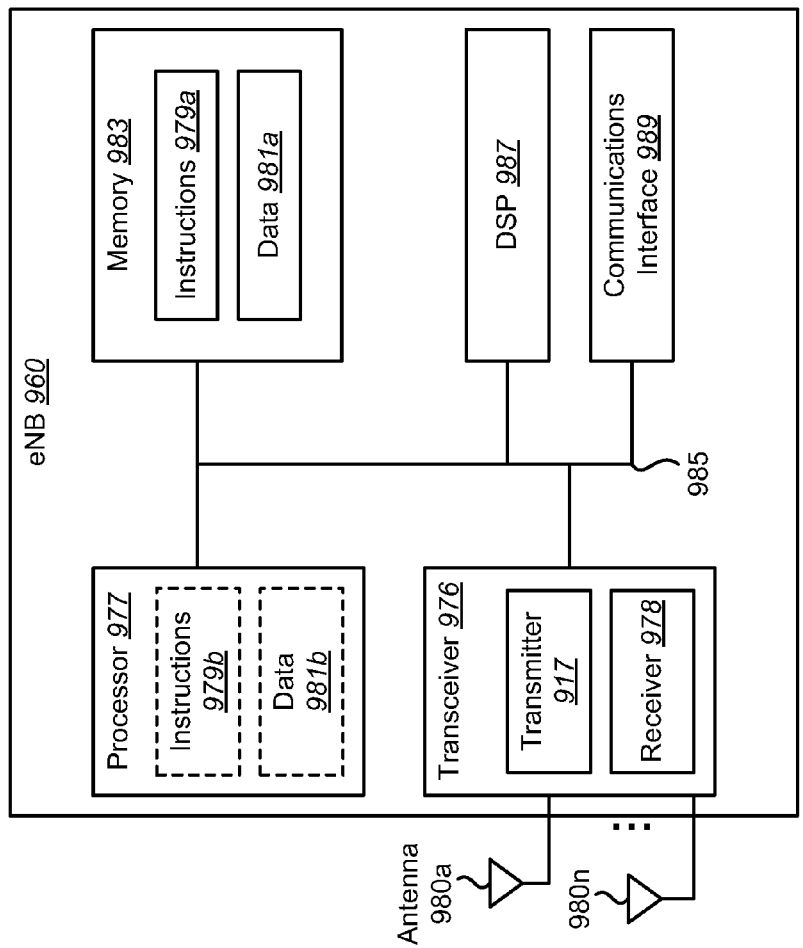
FIG. 9 illustrates various components that may be utilized in an eNB.

FIG. 9 illustrates various components that may be utilized in an eNB 960. The eNB 960 described in connection with FIG. 9 may be implemented in accordance with the eNB 160 described in connection with FIG. 1. The eNB 960 includes a processor 977 that controls operation of the eNB 960. The processor 977 may also be referred to as a central processing unit (CPU). Memory 983, which may include read-only memory (ROM), random access memory (RAM), a combination of the two or any type of device that may store information, provides instructions 979a and data 981a to the processor 977. A portion of the memory 983 may also include non-volatile random access memory (NVRAM). Instructions 979b and data 981b may also reside in the processor 977. Instructions 979b and/or data 981b loaded into the processor 977 may also include instructions 979a and/or data 981a from memory 983 that were loaded for execution or processing by the processor 977. The instructions 979b may be executed by the processor 977 to implement the method 300 described above.

The eNB 960 may also include a housing that contains one or more transmitters 917 and one or more receivers 978 to allow transmission and reception of data. The transmitter(s) 917 and receiver(s) 978 may be combined into one or more transceivers 976. One or more antennas 980a-n are attached to the housing and electrically coupled to the transceiver 976.

The various components of the eNB 960 are coupled together by a bus system 985, which may include a power bus, a control signal bus and a status signal bus, in addition to a data bus. However, for the sake of clarity, the various buses are illustrated in FIG. 9 as the bus system 985. The eNB 960 may also include a digital signal processor (DSP) 987 for use in processing signals. The eNB 960 may also include a communications interface 989 that provides user access to the functions of the eNB 960. The eNB 960 illustrated in FIG. 9 is a functional block diagram rather than a listing of specific components.

Figure 10:
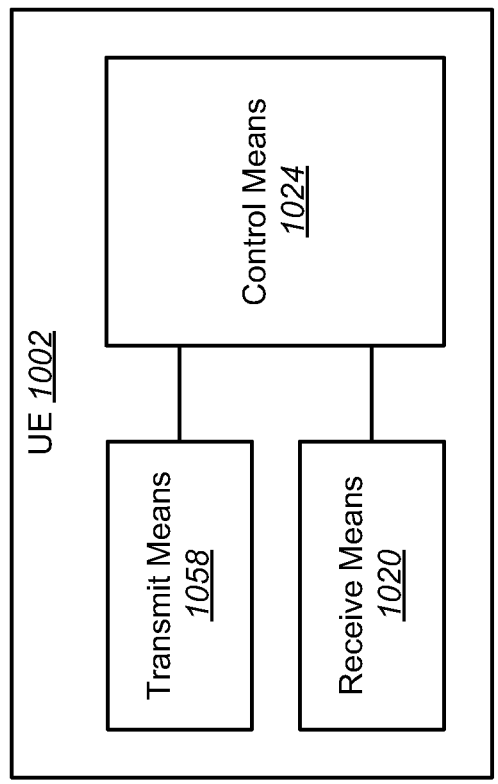
FIG. 10 is a block diagram illustrating one configuration of a UE in which systems and methods for sending feedback information may be implemented.

FIG. 10 is a block diagram illustrating one configuration of a UE 1002 in which systems and methods for sending feedback information may be implemented. The UE 1002 includes transmit means 1058, receive means 1020 and control means 1024. The transmit means 1058, receive means 1020 and control means 1024 may be configured to perform one or more of the functions described in connection with FIG. 2 and FIG. 8 above. FIG. 8 above illustrates one example of a concrete apparatus structure of FIG. 10. Other various structures may be implemented to realize one or more of the functions of FIG. 2 and FIG. 8. For example, a DSP may be realized by software.

Figure 11:
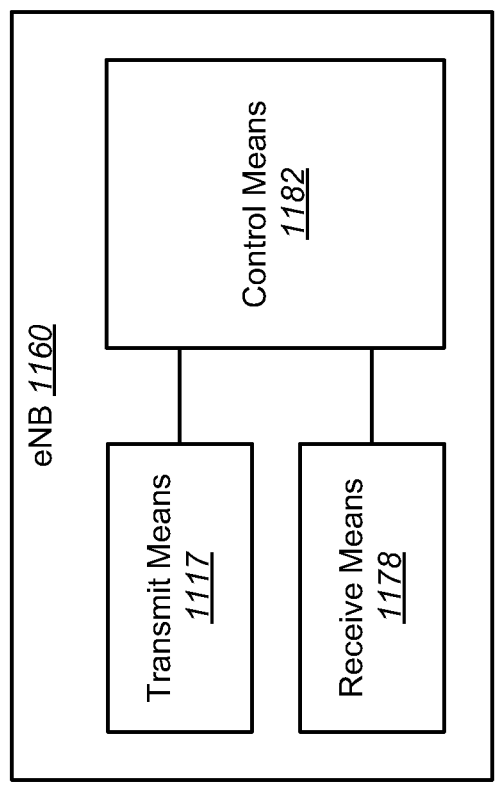
FIG. 11 is a block diagram illustrating one configuration of an eNB in which systems and methods for receiving feedback information may be implemented.

FIG. 11 is a block diagram illustrating one configuration of an eNB 1160 in which systems and methods for receiving feedback information may be implemented. The eNB 1160 includes transmit means 1117, receive means 1178 and control means 1182. The transmit means 1117, receive means 1178 and control means 1182 may be configured to perform one or more of the functions described in connection with FIG. 3 FIG. 9 above. FIG. 9 above illustrates one example of a concrete apparatus structure of FIG. 11. Other various structures may be implemented to realize one or more of the functions of FIG. 3 and FIG. 9. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) for transmitting information to an evolved Node B (eNB), the UE comprising:
   operation controlling circuitry that determines a Time-Division Duplexing (TDD) uplink-downlink (UL-DL) configuration of each serving cell, wherein the TDD UL-DL configurations of at least two configured serving cells are not the same; and
   a transmitter that transmits Hybrid Automatic Repeat Request Acknowledgement/Negative Acknowledgement (HARQ-ACK) information in a subframe n based on a first feedback factor $B_c^{DL}$ according to whether or not a detected Downlink Control Information (DCI) format 0/4 for a c-th serving cell includes a Downlink Assignment Index (DAI) for determining a parameter $W_{DAI}^{UL}$, the first feedback factor $B_c^{DL}$ is the number of subframes for which the UE needs to feedback HARQ-ACK bits for the c-th serving cell, wherein
   in a case of a transmission of the HARQ-ACK information in the subframe n on a Physical Uplink Shared Channel (PUSCH) transmission adjusted based on the detected DCI format 0/4 for the c-th serving cell with the DAI for determining the parameter $W_{DAI}^{UL}$, the first feedback factor $B_c^{DL}$ for the c-th serving cell is determined based on a parameter $M_c$ and the parameter $W_{DAI}^{UL}$, the parameter $W_{DAI}^{UL}$ corresponding to an uplink reference UL-DL configuration of the c-th serving cell corresponding to the PUSCH transmission,
   in a case of the transmission of the HARQ-ACK information in the subframe n on the PUSCH transmission adjusted based on the detected DCI format 0/4 for the c-th serving cell without a value for the parameter $W_{DAI}^{UL}$, the first feedback factor $B_c^{DL}$ for the c-th serving cell is determined based on the parameter $M_c$ but not the parameter $W_{DAI}^{UL}$, the parameter $M_c$ is the number of elements in a set $K_c$, the set $K_c$ includes one or more values of k of the c-th serving cell, the $W_{DAI}^{UL}$ is determined by the DAI,
   the subframe n corresponds to a subframe n−k for the c-th serving cell on a Physical Downlink Shared Channel (PDSCH), and
   it is determined, for each serving cell, whether or not the DCI format 0/4 for the each serving cell includes the DAI based on a configuration of the each serving cell.

2. The UE of claim 1, wherein
   the first feedback factor $B_c^{DL}$ for the c-th serving cell determined based on the parameter $M_c$ and the parameter $W_{DAI}^{UL}$ is determined based on a selected equation among (i) a first equation including the parameter $M_c$ and the parameter $W_{DAI}^{UL}$ and (ii) a second equation, which is different from the first equation, including the parameter $M_c$ and the parameter $W_{DAI}^{UL}$.

3. An evolved Node B (eNB) for receiving information from a User Equipment (UE), the eNB comprising:
operation controlling circuitry that determines a Time-Division Duplexing (TDD) uplink-downlink (UL-DL) configuration of each serving cell, wherein the TDD UL-DL configurations of at least two configured serving cells are not the same; and
a receiver that receives Hybrid Automatic Repeat Request Acknowledgement/Negative Acknowledgement (HARQ-ACK) information in a subframe n based on a first feedback factor $B_c^{DL}$ according to whether or not a detected Downlink Control Information (DCI) format 0/4 for a c-th serving cell includes a Downlink Assignment Index (DAI) for determining a parameter $W_{DAI}^{UL}$, the first feedback factor $B_c^{DL}$ is the number of subframes for which the UE needs to feedback HARQ-ACK bits for the c-th serving cell, wherein
in a case of a transmission of the HARQ-ACK information in the subframe n on a Physical Uplink Shared Channel (PUSCH) transmission adjusted based on the detected DCI format 0/4 for the c-th serving cell with the DAI for determining the parameter $W_{DAI}^{UL}$, the first feedback factor $B_c^{DL}$ for the c-th serving cell is determined based on a parameter $M_c$ and the parameter $W_{DAI}^{UL}$, the parameter $W_{DAI}^{UL}$ corresponding to an uplink reference UL-DL configuration of the c-th serving cell corresponding to the PUSCH transmission,
in a case of the transmission of the HARQ-ACK information in the subframe n on the PUSCH transmission adjusted based on the detected DCI format 0/4 for the serving cell without a value for the parameter $W_{DAI}^{UL}$, the first feedback factor $B_c^{DL}$ for the c-th serving cell is determined based on the parameter $M_c$ but not the parameter $W_{DAI}^{UL}$, the parameter $M_c$ is the number of elements in a set $K_c$, the set $K_c$ includes one or more values of k of the c-th serving cell, and the $W_{DAI}^{UL}$ is determined by the DAI, and the subframe n corresponds to a subframe n−k for the c-th serving cell on a Physical Downlink Shared Channel (PDSCH), and
it is determined, for each serving cell, whether or not the DCI format 0/4 for the each serving cell includes the DAI based on a configuration of the each serving cell.

4. The eNB of claim 3, wherein
the first feedback factor $B_c^{DL}$ for the c-th serving cell determined based on the parameter $M_c$ and the parameter $W_{DAI}^{UL}$ is determined based on a selected equation among (i) a first equation including the parameter $M_c$ and the parameter $W_{DAI}^{UL}$ and (ii) a second equation, which is different from the first equation, including the parameter $M_c$ and the parameter $W_{DAI}^{UL}$.

5. A method for transmitting information by a User Equipment (UE), the method comprising:
determining a Time-Division Duplexing (TDD) uplink-downlink (UL-DL) configuration of each serving cell, wherein the TDD UL-DL configurations of at least two configured serving cells are not the same; and
transmitting Hybrid Automatic Repeat Request Acknowledgement/Negative Acknowledgement (HARQ-ACK) information in a subframe n based on a first feedback factor $B_c^{DL}$ according to whether or not a detected Downlink Control Information (DCI) format 0/4 for a c-th serving cell includes a Downlink Assignment Index (DAI) for determining a parameter $W_{DAI}^{UL}$, the first feedback factor $B_c^{DL}$ is the number of subframes for which the UE needs to feedback HARQ-ACK bits for the c-th serving cell, wherein
in a case of a transmission of the HARQ-ACK information in the subframe n on a Physical Uplink Shared Channel (PUSCH) transmission adjusted based on the detected DCI format 0/4 for the c-th serving cell with the DAI determining the parameter $W_{DAI}^{UL}$, the first feedback factor $B_c^{DL}$ for the c-th serving cell is determined based on a parameter $M_c$ and the parameter $W_{DAI}^{UL}$, the parameter $W_{DAI}^{UL}$ corresponding to an uplink reference UL-DL configuration of the c-th serving cell corresponding to the PUSCH transmission,
in a case of the transmission of the HARQ-ACK information in the subframe n on the PUSCH transmission adjusted based on the detected DCI format 0/4 for the c-th serving cell without a value for the parameter $W_{DAI}^{UL}$, the first feedback factor $B_c^{DL}$ for the c-th serving cell is determined based on the parameter $M_c$ but not the parameter $W_{DAI}^{UL}$, the parameter $M_c$ is the number of elements in a set $K_c$, the set $K_c$ includes one or more values of k of the c-th serving cell, and the $W_{DAI}^{UL}$ is determined by the DAI, and the subframe n corresponds to a subframe n−k for the c-th serving cell on a Physical Downlink Shared Channel (PDSCH), and
it is determined, for each serving cell, whether or not the DCI format 0/4 for the each serving cell includes the DAI based on a configuration of the each serving cell.

6. The method for transmitting information by the UE of claim 5, wherein
the first feedback factor $B_c^{DL}$ for the c-th serving cell determined based on the parameter $M_c$ and the parameter $W_{DAI}^{UL}$ is determined based on a selected equation among (i) a first equation including the parameter $M_c$ and the parameter $W_{DAI}^{UL}$ and (ii) a second equation, which is different from the first equation, including the parameter $M_c$ and the parameter $W_{DAI}^{UL}$.

7. A method for receiving information by an evolved Node B (eNB), the method comprising:
determining a Time-Division Duplexing (TDD) uplink-downlink (UL-DL) configuration of each serving cell, wherein the TDD UL-DL configurations of at least two configured serving cells are not the same;
receiving Hybrid Automatic Repeat Request Acknowledgement/Negative Acknowledgement (HARQ-ACK) information in a subframe n based on a first feedback factor $B_c^{DL}$ according to whether or not a detected Downlink Control Information (DCI) format 0/4 for a c-th serving cell includes a Downlink Assignment Index (DAI) for determining a parameter $W_{DAI}^{UL}$, the first feedback factor $B_c^{DL}$ is the number of subframes for which the UE needs to feedback HARQ-ACK bits for the c-th serving cell, wherein
in a case of a transmission of the HARQ-ACK information in the subframe n on a Physical Uplink Shared Channel (PUSCH) transmission adjusted based on the detected DCI format 0/4 for the c-th serving cell with the DAI for determining the parameter $W_{DAI}^{UL}$, the first feedback factor $B_c^{DL}$ for the c-th serving cell is determined based on a parameter $M_c$ and the parameter $W_{DAI}^{UL}$, the parameter $W_{DAI}^{UL}$ corresponding to an uplink reference UL-DL configuration of the c-th serving cell corresponding to the PUSCH transmission,
in case of the transmission of the HARQ-ACK information in the subframe n on the PUSCH transmission adjusted based on the detected DCI format 0/4 for the c-th serving cell without a value for the parameter $W_{DAI}^{UL}$, the first feedback factor $B_c^{DL}$ for the c-th serving cell is determined based on the parameter $M_c$ but not the parameter $W_{DAI}^{UL}$, the parameter $M_c$ is the number of elements in a set $K_c$, the set $K_c$ includes one or more values of k of the c-th serving cell, and the $W_{DAI}^{UL}$ is determined by the DAI, and the subframe n corresponds to a subframe n−k for the c-th serving cell on a Physical Downlink Shared Channel (PDSCH), and it is determined, for each serving cell, whether or not the DCI format 0/4 for the each serving cell includes the DAI based on a configuration of the each serving cell.

8. The method for receiving information by the eNB of claim 7, wherein the first feedback factor $B_c^{DL}$ for the c-th serving cell determined based on the parameter $M_c$ and the parameter $W_{DAI}^{UL}$ is determined based on a selected equation among (i) a first equation including the parameter $M_c$ and the parameter $W_{DAI}^{UL}$ and (ii) a second equation, which is different from the first equation, including the parameter $M_c$ and the parameter $W_{DAI}^{UL}$.

* * * * *